(12) United States Patent
Kelkar et al.

(10) Patent No.: US 7,937,651 B2
(45) Date of Patent: May 3, 2011

(54) STRUCTURAL EDITING OPERATIONS FOR NETWORK FORMS

(75) Inventors: Amol S. Kelkar, Redmond, WA (US); Brian G. O'Connor, Seattle, WA (US); Jonathan E. Rivers-Moore, Bellevue, WA (US); Prakash Sikchi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1024 days.

(21) Appl. No.: 11/036,910

(22) Filed: Jan. 14, 2005

(65) Prior Publication Data

US 2006/0161837 A1 Jul. 20, 2006

(51) Int. Cl.
*G06F 17/24* (2006.01)

(52) U.S. Cl. .................. 715/223; 715/221; 715/222

(58) Field of Classification Search .................. 715/200, 715/221, 222, 223, 236, 237, 240, 249, 253
See application file for complete search history.

(56) References Cited

U.S. PATENT DOCUMENTS

| | | | |
|---|---|---|---|
| 2,804,878 | A | 9/1957 | Fishwood et al. |
| 3,091,077 | A | 5/1963 | Erickson et al. |
| 3,104,520 | A | 9/1963 | Cazier et al. |
| 3,195,805 | A | 7/1965 | Cholvin et al. |
| 3,196,606 | A | 7/1965 | Cholvin et al. |
| 3,812,942 | A | 5/1974 | Espenschied et al. |
| 3,874,828 | A | 4/1975 | Herschler et al. |
| 3,961,748 | A | 6/1976 | McNabney |
| 4,005,578 | A | 2/1977 | McNabney |
| 4,005,579 | A | 2/1977 | Lloyd |
| 4,060,340 | A | 11/1977 | Yanik et al. |
| 4,089,623 | A | 5/1978 | Hofmann, Jr. |
| 4,201,978 | A | 5/1980 | Nally |
| 4,256,019 | A | 3/1981 | Braddick |
| 4,362,475 | A | 12/1982 | Seitz |
| 4,391,184 | A | 7/1983 | Yamane et al. |
| 4,396,345 | A | 8/1983 | Hutchinson |
| 4,498,147 | A | 2/1985 | Agnew et al. |
| 4,514,800 | A | 4/1985 | Gruner et al. |
| 4,514,985 | A | 5/1985 | Cadeddu |
| 4,564,752 | A | 1/1986 | Lepic et al. |
| 4,641,274 | A | 2/1987 | Swank |

(Continued)

FOREIGN PATENT DOCUMENTS

EP 0841615 11/1999

(Continued)

OTHER PUBLICATIONS

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

(Continued)

*Primary Examiner* — Stephen S Hong
*Assistant Examiner* — Gregory J Vaughn

(57) ABSTRACT

Systems and/or methods that enable an operation associated with an altered structure of a data instance of a network form without first altering the structure of the data instance are described. These systems and/or methods, in one embodiment, enable an operation of a network form eventually requiring alteration of a structure of a data instance of the network form without first performing a roundtrip with the network form's network computer. In another embodiment, the systems and/or methods approximate a view and editing experience associated with a structural change to a data instance of a network form without structurally changing the data instance.

19 Claims, 4 Drawing Sheets

U.S. PATENT DOCUMENTS

| | | |
|---|---|---|
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,926,476 A | 5/1990 | Covey |
| 4,933,880 A | 6/1990 | Borgendale et al. |
| 4,962,475 A | 10/1990 | Hernandez et al. |
| 5,025,484 A | 6/1991 | Yamanari et al. |
| 5,072,412 A | 12/1991 | Henderson, Jr. et al. |
| 5,140,563 A | 8/1992 | Thinesen |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,257,646 A | 11/1993 | Meyer |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffernan et al. |
| 5,381,547 A | 1/1995 | Flug et al. |
| 5,388,967 A | 2/1995 | Firnhaber et al. |
| 5,388,968 A | 2/1995 | Wood et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,428,738 A | 6/1995 | Carter et al. |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,456,582 A | 10/1995 | Firnhaber et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,537,596 A | 7/1996 | Yu et al. |
| 5,540,558 A | 7/1996 | Harden et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,556,271 A | 9/1996 | Zuercher et al. |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,613,837 A | 3/1997 | Konishi et al. |
| 5,625,783 A | 4/1997 | Ezekiel et al. |
| 5,627,979 A | 5/1997 | Chang et al. |
| 5,630,126 A | 5/1997 | Redpath |
| 5,630,706 A | 5/1997 | Yang |
| 5,634,113 A | 5/1997 | Rusterholz |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,655,887 A | 8/1997 | Chou |
| 5,659,729 A | 8/1997 | Nielsen |
| 5,664,133 A | 9/1997 | Malamud et al. |
| 5,664,178 A | 9/1997 | Sinofsky |
| 5,664,938 A | 9/1997 | Yang |
| 5,668,966 A | 9/1997 | Ono et al. |
| 5,669,005 A | 9/1997 | Curbow et al. |
| 5,681,151 A | 10/1997 | Wood |
| 5,682,536 A | 10/1997 | Atkinson et al. |
| 5,689,667 A | 11/1997 | Kurtenbach |
| 5,689,703 A | 11/1997 | Atkinson et al. |
| 5,692,540 A | 12/1997 | Huang |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,742,795 A * | 4/1998 | Kussel .............................. 703/2 |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,785,081 A | 7/1998 | Krawczyk et al. |
| 5,787,274 A | 7/1998 | Agrawal et al. |
| 5,790,796 A | 8/1998 | Sadowsky |
| 5,798,757 A | 8/1998 | Smith |
| 5,799,311 A | 8/1998 | Agrawal et al. |
| 5,801,701 A | 9/1998 | Koppolu et al. |
| 5,802,304 A | 9/1998 | Stone |
| 5,803,715 A | 9/1998 | Kitchener |
| 5,806,079 A | 9/1998 | Rivette et al. |
| 5,815,830 A | 9/1998 | Anthony |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,870,735 A | 2/1999 | Agrawal et al. |
| 5,873,088 A | 2/1999 | Hayashi et al. |
| 5,875,815 A | 3/1999 | Ungerecht et al. |
| 5,905,492 A | 5/1999 | Straub et al. |
| 5,907,621 A | 5/1999 | Bachman et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff et al. |
| 5,922,072 A | 7/1999 | Hutchinson et al. |

| | | |
|---|---|---|
| 5,928,363 A | 7/1999 | Ruvolo |
| 5,929,858 A | 7/1999 | Shibata et al. |
| RE36,281 E | 8/1999 | Zuercher et al. |
| 5,940,075 A | 8/1999 | Mutschler, III et al. |
| 5,947,711 A | 9/1999 | Myers et al. |
| 5,950,010 A | 9/1999 | Hesse et al. |
| 5,950,221 A | 9/1999 | Draves et al. |
| 5,953,731 A | 9/1999 | Glaser |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,006,227 A | 12/1999 | Freeman et al. |
| 6,006,241 A | 12/1999 | Purnaveja et al. |
| 6,012,066 A | 1/2000 | Discount et al. |
| 6,014,135 A | 1/2000 | Fernandes |
| 6,016,520 A | 1/2000 | Facq et al. |
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,057,837 A | 5/2000 | Hatakeda et al. |
| 6,058,413 A | 5/2000 | Flores et al. |
| 6,065,043 A | 5/2000 | Domenikos et al. |
| 6,069,626 A | 5/2000 | Cline et al. |
| 6,070,184 A | 5/2000 | Blount et al. |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,679 A | 7/2000 | Barkley |
| 6,088,708 A | 7/2000 | Burch et al. |
| 6,091,417 A | 7/2000 | Lefkowitz |
| 6,094,657 A | 7/2000 | Hailpern et al. |
| 6,096,096 A | 8/2000 | Murphy et al. |
| 6,097,382 A | 8/2000 | Rosen et al. |
| 6,098,081 A | 8/2000 | Heidorn et al. |
| 6,105,012 A | 8/2000 | Chang et al. |
| 6,106,570 A | 8/2000 | Mizuhara |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,178,551 B1 | 1/2001 | Sana et al. |
| 6,182,094 B1 | 1/2001 | Humpleman et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,423 B1 | 4/2001 | Davis |
| 6,219,698 B1 | 4/2001 | Iannucci et al. |
| 6,225,996 B1 | 5/2001 | Gibb et al. |
| 6,235,027 B1 | 5/2001 | Herzon |
| 6,243,088 B1 | 6/2001 | McCormack et al. |
| 6,247,016 B1 | 6/2001 | Rastogi et al. |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,275,227 B1 | 8/2001 | DeStefano |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,709 B1 | 8/2001 | Reha et al. |
| 6,282,711 B1 | 8/2001 | Halpern et al. |
| 6,286,033 B1 | 9/2001 | Kishinsky et al. |
| 6,286,130 B1 | 9/2001 | Poulsen et al. |
| 6,292,897 B1 | 9/2001 | Gennaro et al. |
| 6,292,941 B1 | 9/2001 | Jollands |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 | 10/2001 | Goertzel et al. |
| 6,311,221 B1 | 10/2001 | Raz et al. |
| 6,311,271 B1 | 10/2001 | Gennaro et al. |
| 6,314,415 B1 | 11/2001 | Mukherjee |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,336,214 B1 | 1/2002 | Sundaresan |
| 6,336,797 B1 | 1/2002 | Kazakis et al. |
| 6,342,907 B1 | 1/2002 | Petty et al. |
| 6,343,149 B1 | 1/2002 | Motoiwa |
| 6,343,302 B1 | 1/2002 | Graham |
| 6,343,377 B1 | 1/2002 | Gessner et al. |
| 6,344,862 B1 | 2/2002 | Williams et al. |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,851 B1 | 3/2002 | Anupam et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,385,767 B1 | 5/2002 | Ziebell |
| 6,389,434 B1 | 5/2002 | Rivette |
| 6,393,456 B1 | 5/2002 | Ambler et al. |
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,401,077 B1 | 6/2002 | Godden et al. |
| 6,405,221 B1 | 6/2002 | Levine et al. |
| 6,405,238 B1 | 6/2002 | Votipka |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,421,777 B1 | 7/2002 | Pierre-Louis et al. |
| 6,425,125 B1 | 7/2002 | Fries et al. |
| 6,427,142 B1 | 7/2002 | Zachary et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,434,743 B1 | 8/2002 | Click et al. |
| 6,442,563 B1 | 8/2002 | Bacon et al. |

| | | |
|---|---|---|
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu |
| 6,463,419 B1 | 10/2002 | Kluss |
| 6,470,349 B1 | 10/2002 | Heninger |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky |
| 6,480,860 B1 | 11/2002 | Monday |
| 6,487,566 B1 | 11/2002 | Sundaresan |
| 6,490,601 B1 | 12/2002 | Markus et al. |
| 6,493,006 B1 | 12/2002 | Gourdol et al. |
| 6,493,007 B1 | 12/2002 | Pang |
| 6,493,702 B1 | 12/2002 | Adar et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan et al. |
| 6,505,300 B2 | 1/2003 | Chan et al. |
| 6,505,344 B1 | 1/2003 | Blais et al. |
| 6,507,856 B1 | 1/2003 | Chen et al. |
| 6,513,154 B1 | 1/2003 | Porterfield |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee et al. |
| 6,539,464 B1 | 3/2003 | Getov |
| RE38,070 E | 4/2003 | Spies et al. |
| 6,546,546 B1 | 4/2003 | Van Doorn |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,604,238 B1 | 8/2003 | Lim et al. |
| 6,606,606 B2 | 8/2003 | Starr |
| 6,609,200 B2 | 8/2003 | Anderson et al. |
| 6,611,812 B2 | 8/2003 | Hurtado et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,625,622 B1 | 9/2003 | Henrickson et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,640,249 B1 | 10/2003 | Bowman-Amuah |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,658,652 B1 | 12/2003 | Alexander et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,625 B1 * | 1/2004 | Reise et al. ............... 702/117 |
| 6,678,717 B1 | 1/2004 | Schneider |
| 6,681,370 B2 | 1/2004 | Gounares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,735,721 B1 | 5/2004 | Morrow et al. |
| 6,738,783 B2 * | 5/2004 | Melli et al. ............... 707/103 R |
| 6,745,367 B1 | 6/2004 | Bates et al. |
| 6,748,385 B1 | 6/2004 | Rodkin |
| 6,748,569 B1 | 6/2004 | Brooke et al. |
| 6,751,777 B2 | 6/2004 | Bates |
| 6,754,874 B1 | 6/2004 | Richman |
| 6,757,826 B1 | 6/2004 | Paltenghe |
| 6,757,868 B1 | 6/2004 | Glaser et al. |
| 6,757,890 B1 * | 6/2004 | Wallman ............... 717/148 |
| 6,760,723 B2 | 7/2004 | Oshinsky et al. |
| 6,763,343 B1 | 7/2004 | Brooke et al. |
| 6,766,526 B1 | 7/2004 | Ellis |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,823,478 B1 | 11/2004 | Prologo et al. |
| 6,828,992 B1 | 12/2004 | Freeman et al. |
| 6,829,745 B2 | 12/2004 | Yassin et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,130 B1 | 3/2005 | Baweja et al. |
| 6,874,143 B1 | 3/2005 | Murray et al. |
| 6,876,996 B2 | 4/2005 | Czajkowski et al. |
| 6,883,168 B1 | 4/2005 | James et al. |
| 6,885,748 B1 | 4/2005 | Wang |
| 6,889,359 B1 | 5/2005 | Conner et al. |
| 6,901,403 B1 | 5/2005 | Bata et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,129 B2 | 9/2005 | Marce et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,950,987 B1 | 9/2005 | Hargraves et al. |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |

| Patent | Kind | Date | Inventor |
|---|---|---|---|
| 6,993,714 | B2 | 1/2006 | Kaler et al. |
| 6,993,722 | B1 | 1/2006 | Greer et al. |
| 6,996,776 | B1 | 2/2006 | Makely et al. |
| 6,996,781 | B1 | 2/2006 | Myers et al. |
| 7,000,179 | B2 | 2/2006 | Yankovich et al. |
| 7,002,560 | B2 | 2/2006 | Graham |
| 7,003,548 | B1 | 2/2006 | Barck et al. |
| 7,003,722 | B2 | 2/2006 | Rothchiller et al. |
| 7,010,580 | B1 | 3/2006 | Fu et al. |
| 7,020,869 | B2 | 3/2006 | Abriari et al. |
| 7,024,417 | B1 | 4/2006 | Russakovsky et al. |
| 7,032,170 | B2 | 4/2006 | Poulose |
| 7,036,072 | B1 | 4/2006 | Sulistio et al. |
| 7,039,875 | B2 | 5/2006 | Khalfay et al. |
| 7,043,687 | B2 | 5/2006 | Knauss et al. |
| 7,051,273 | B1 | 5/2006 | Holt et al. |
| 7,058,645 | B2 | 6/2006 | Seto et al. |
| 7,058,663 | B2 | 6/2006 | Johnston et al. |
| 7,062,764 | B2 | 6/2006 | Cohen et al. |
| 7,065,493 | B1 | 6/2006 | Homsi |
| 7,076,728 | B2 | 7/2006 | Davis et al. |
| 7,080,083 | B2 | 7/2006 | Kim et al. |
| 7,080,325 | B2 | 7/2006 | Treibach-Heck et al. |
| 7,081,882 | B2 | 7/2006 | Sowden et al. |
| 7,086,009 | B2 | 8/2006 | Resnick et al. |
| 7,086,042 | B2 | 8/2006 | Abe et al. |
| 7,088,374 | B2 | 8/2006 | David et al. |
| 7,100,147 | B2 | 8/2006 | Miller et al. |
| 7,103,611 | B2 | 9/2006 | Murthy et al. |
| 7,106,888 | B1 | 9/2006 | Silverbrook et al. |
| 7,107,282 | B1 | 9/2006 | Yalmanchi |
| 7,107,521 | B2 | 9/2006 | Santos |
| 7,107,522 | B1 | 9/2006 | Morgan et al. |
| 7,107,539 | B2 | 9/2006 | Abbott et al. |
| 7,120,863 | B1 | 10/2006 | Wang |
| 7,124,167 | B1 | 10/2006 | Bellotti et al. |
| 7,124,251 | B2 | 10/2006 | Clark et al. |
| 7,130,885 | B2 | 10/2006 | Chandra et al. |
| 7,143,341 | B1 | 11/2006 | Kohli |
| 7,146,564 | B2 | 12/2006 | Kim et al. |
| 7,152,027 | B2 | 12/2006 | Andrade et al. |
| 7,152,205 | B2 | 12/2006 | Day et al. |
| 7,159,011 | B1 | 1/2007 | Knight et al. |
| 7,168,035 | B1 | 1/2007 | Bell et al. |
| 7,178,166 | B1 | 2/2007 | Taylor et al. |
| 7,190,376 | B1 | 3/2007 | Tonisson |
| 7,191,394 | B1 | 3/2007 | Ardeleanu et al. |
| 7,197,515 | B2 | 3/2007 | Rivers-Moore et al. |
| 7,200,665 | B2 | 4/2007 | Eshghi et al. |
| 7,200,816 | B2 | 4/2007 | Falk et al. |
| 7,213,200 | B2 | 5/2007 | Abe et al. |
| 7,228,541 | B2 | 6/2007 | Gupton et al. |
| 7,234,105 | B2 | 6/2007 | Bezrukov et al. |
| 7,236,982 | B2 | 6/2007 | Zlatanov et al. |
| 7,237,114 | B1 | 6/2007 | Rosenberg |
| 7,249,328 | B1 | 7/2007 | Davis |
| 7,251,777 | B1 | 7/2007 | Valtchev et al. |
| 7,269,664 | B2 | 9/2007 | Hutsch et al. |
| 7,269,788 | B2 | 9/2007 | Gharavy |
| 7,272,815 | B1 | 9/2007 | Eldridge et al. |
| 7,275,216 | B2 | 9/2007 | Paoli et al. |
| 7,281,018 | B1 | 10/2007 | Begun et al. |
| 7,281,206 | B2 | 10/2007 | Schnelle et al. |
| 7,281,245 | B2 | 10/2007 | Reynar et al. |
| 7,284,208 | B2 | 10/2007 | Matthews |
| 7,287,218 | B1 | 10/2007 | Knotz et al. |
| 7,293,268 | B2 | 11/2007 | Masuda et al. |
| 7,296,017 | B2 | 11/2007 | Larcheveque et al. |
| 7,308,646 | B1 | 12/2007 | Cohen et al. |
| 7,313,757 | B2 | 12/2007 | Bradley et al. |
| 7,313,758 | B2 | 12/2007 | Kozlov |
| 7,316,003 | B1 | 1/2008 | Dulepet et al. |
| 7,318,237 | B2 | 1/2008 | Moriconi et al. |
| 7,337,391 | B2 | 2/2008 | Clarke et al. |
| 7,337,392 | B2 | 2/2008 | Lue |
| 7,346,610 | B2 | 3/2008 | Ruthfield et al. |
| 7,346,840 | B1 | 3/2008 | Ravishankar et al. |
| 7,346,848 | B1 | 3/2008 | Ruthfield et al. |
| 7,350,141 | B2 | 3/2008 | Kotler et al. |
| 7,370,066 | B1 | 5/2008 | Sikchi et al. |
| 7,373,595 | B2 | 5/2008 | Jones et al. |
| 7,376,673 | B1 | 5/2008 | Chalecki et al. |
| 7,406,660 | B1 | 7/2008 | Sikchi et al. |
| 7,412,649 | B2 | 8/2008 | Emek et al. |
| 7,424,671 | B2 | 9/2008 | Elza et al. |
| 7,428,699 | B1 | 9/2008 | Kane et al. |
| 7,430,711 | B2 | 9/2008 | Rivers-Moore et al. |
| 7,441,200 | B2 | 10/2008 | Savage |
| 7,451,392 | B1 | 11/2008 | Chalecki et al. |
| 7,490,167 | B2 | 2/2009 | Pena et al. |
| 7,496,632 | B2 | 2/2009 | Chapman et al. |
| 7,496,837 | B1 | 2/2009 | Larcheveque et al. |
| 7,512,896 | B2 | 3/2009 | Rockey et al. |
| 7,516,399 | B2 | 4/2009 | Hsu et al. |
| 7,533,268 | B1 | 5/2009 | Catorcini |
| 7,543,228 | B2 | 6/2009 | Kelkar |
| 7,549,115 | B2 | 6/2009 | Kotler |
| 7,562,215 | B2 | 7/2009 | Cummins |
| 7,568,101 | B1 | 7/2009 | Catorcini |
| 7,581,177 | B1 | 8/2009 | Mollicone et al. |
| 7,584,417 | B2 | 9/2009 | Friend |
| 7,610,562 | B2 | 10/2009 | Rockey et al. |
| 7,613,996 | B2 | 11/2009 | Dallett et al. |
| 7,624,356 | B1 | 11/2009 | Rockey et al. |
| 7,653,687 | B2 | 1/2010 | Reisman |
| 7,669,116 | B2 | 2/2010 | Lopata et al. |
| 7,689,929 | B2 | 3/2010 | Ruthfield |
| 7,692,636 | B2 | 4/2010 | Kim |
| 7,712,022 | B2 | 5/2010 | Smuga et al. |
| 7,712,048 | B2 | 5/2010 | Rockey et al. |
| 7,721,190 | B2 | 5/2010 | Sikchi |
| 7,725,834 | B2 | 5/2010 | Bell |
| 7,743,063 | B2 | 6/2010 | James et al. |
| 7,774,620 | B1 | 8/2010 | Stott |
| 7,779,027 | B2 | 8/2010 | James |
| 7,809,698 | B1 | 10/2010 | Salz et al. |
| 7,818,677 | B2 | 10/2010 | Ruthfield |
| 7,865,477 | B2 | 1/2011 | Larcheveque et al. |
| 7,900,134 | B2 | 3/2011 | Ardeleanu et al. |
| 7,913,159 | B2 | 3/2011 | Larcheveque |
| 2001/0003828 | A1 | 6/2001 | Peterson et al. |
| 2001/0007109 | A1 | 7/2001 | Lange |
| 2001/0016880 | A1 | 8/2001 | Cai et al. |
| 2001/0022592 | A1 | 9/2001 | Alimpich et al. |
| 2001/0024195 | A1 | 9/2001 | Hayakawa |
| 2001/0037345 | A1 | 11/2001 | Kiernan et al. |
| 2001/0044850 | A1 | 11/2001 | Raz et al. |
| 2001/0051928 | A1 | 12/2001 | Brody |
| 2001/0052121 | A1 | 12/2001 | Masuda et al. |
| 2001/0054004 | A1 | 12/2001 | Powers |
| 2001/0056411 | A1 | 12/2001 | Lindskog et al. |
| 2001/0056414 | A1 | 12/2001 | Moore et al. |
| 2001/0056460 | A1 | 12/2001 | Sahota et al. |
| 2002/0010700 | A1 | 1/2002 | Wotring |
| 2002/0010743 | A1 | 1/2002 | Ryan et al. |
| 2002/0010746 | A1 | 1/2002 | Jilk et al. |
| 2002/0010855 | A1 | 1/2002 | Reshef et al. |
| 2002/0013788 | A1 | 1/2002 | Pennell et al. |
| 2002/0019941 | A1 | 2/2002 | Chan et al. |
| 2002/0023111 | A1 | 2/2002 | Arora et al. |
| 2002/0023113 | A1 | 2/2002 | Hsing et al. |
| 2002/0026441 | A1 | 2/2002 | Kutay et al. |
| 2002/0026461 | A1 | 2/2002 | Kutay et al. |
| 2002/0032590 | A1 | 3/2002 | Anand et al. |
| 2002/0032692 | A1 | 3/2002 | Suzuki et al. |
| 2002/0032706 | A1 | 3/2002 | Perla et al. |
| 2002/0032768 | A1 | 3/2002 | Voskuil |
| 2002/0035579 | A1 | 3/2002 | Wang et al. |
| 2002/0035581 | A1 | 3/2002 | Reynar et al. |
| 2002/0040469 | A1 | 4/2002 | Pramberger |
| 2002/0049790 | A1 | 4/2002 | Ricker et al. |
| 2002/0052769 | A1 | 5/2002 | Navani et al. |
| 2002/0053021 | A1 | 5/2002 | Rice et al. |
| 2002/0054126 | A1 | 5/2002 | Gamon |
| 2002/0054128 | A1 | 5/2002 | Lau et al. |
| 2002/0057297 | A1 | 5/2002 | Grimes et al. |
| 2002/0065798 | A1 | 5/2002 | Bostleman et al. |
| 2002/0065847 | A1 | 5/2002 | Furukawa et al. |

| | | | | | | |
|---|---|---|---|---|---|---|
| 2002/0065950 A1* | 5/2002 | Katz et al. ............... 709/318 | | 2003/0120671 A1 | 6/2003 | Kim et al. |
| 2002/0070973 A1 | 6/2002 | Croley | | 2003/0120686 A1 | 6/2003 | Kim et al. |
| 2002/0078074 A1 | 6/2002 | Cho et al. | | 2003/0126555 A1 | 7/2003 | Aggarwal et al. |
| 2002/0078103 A1 | 6/2002 | Gorman et al. | | 2003/0128196 A1 | 7/2003 | Lapstun et al. |
| 2002/0083145 A1 | 6/2002 | Perinpanathan | | 2003/0135825 A1 | 7/2003 | Gertner et al. |
| 2002/0083148 A1 | 6/2002 | Shaw et al. | | 2003/0140132 A1 | 7/2003 | Champagne et al. |
| 2002/0083318 A1 | 6/2002 | Larose | | 2003/0140160 A1 | 7/2003 | Raz et al. |
| 2002/0091738 A1 | 7/2002 | Rohrabaugh et al. | | 2003/0142072 A1 | 7/2003 | Lapstun et al. |
| 2002/0099952 A1 | 7/2002 | Lambert et al. | | 2003/0149934 A1 | 8/2003 | Worden |
| 2002/0100027 A1 | 7/2002 | Binding et al. | | 2003/0154464 A1 | 8/2003 | Ullmann et al. |
| 2002/0103711 A1* | 8/2002 | Karas et al. ............... 705/26 | | 2003/0158897 A1 | 8/2003 | Ben-Natan et al. |
| 2002/0107885 A1 | 8/2002 | Brooks et al. | | 2003/0163285 A1 | 8/2003 | Nakamura et al. |
| 2002/0111699 A1* | 8/2002 | Melli et al. ............... 700/18 | | 2003/0167277 A1 | 9/2003 | Hejlsberg et al. |
| 2002/0111932 A1 | 8/2002 | Roberge et al. | | 2003/0172113 A1 | 9/2003 | Cameron et al. |
| 2002/0112224 A1 | 8/2002 | Cox | | 2003/0182268 A1 | 9/2003 | Lal |
| 2002/0129056 A1 | 9/2002 | Conant et al. | | 2003/0182327 A1 | 9/2003 | Ramanujam et al. |
| 2002/0133484 A1 | 9/2002 | Chau et al. | | 2003/0187756 A1 | 10/2003 | Klivington et al. |
| 2002/0147726 A1 | 10/2002 | Yehia et al. | | 2003/0187930 A1 | 10/2003 | Ghaffar et al. |
| 2002/0147748 A1 | 10/2002 | Huang | | 2003/0188260 A1 | 10/2003 | Jensen et al. |
| 2002/0152222 A1 | 10/2002 | Holbrook | | 2003/0189593 A1 | 10/2003 | Yarvin |
| 2002/0152244 A1 | 10/2002 | Dean et al. | | 2003/0192008 A1 | 10/2003 | Lee |
| 2002/0156772 A1 | 10/2002 | Chau et al. | | 2003/0200506 A1 | 10/2003 | Abe et al. |
| 2002/0156846 A1 | 10/2002 | Rawat et al. | | 2003/0204481 A1 | 10/2003 | Lau |
| 2002/0156929 A1 | 10/2002 | Hekmatpour | | 2003/0204511 A1 | 10/2003 | Brundage |
| 2002/0169752 A1 | 11/2002 | Kusama et al. | | 2003/0204814 A1 | 10/2003 | Elo et al. |
| 2002/0169789 A1 | 11/2002 | Kutay et al. | | 2003/0205615 A1 | 11/2003 | Marappan |
| 2002/0174147 A1 | 11/2002 | Wang et al. | | 2003/0210428 A1 | 11/2003 | Bevlin et al. |
| 2002/0174417 A1 | 11/2002 | Sijacic et al. | | 2003/0212664 A1 | 11/2003 | Breining et al. |
| 2002/0178187 A1 | 11/2002 | Rasmussen et al. | | 2003/0212902 A1 | 11/2003 | van der Made |
| 2002/0178380 A1 | 11/2002 | Wolf et al. | | 2003/0212988 A1 | 11/2003 | Tsai et al. |
| 2002/0184188 A1 | 12/2002 | Mandyam et al. | | 2003/0217053 A1 | 11/2003 | Bachman et al. |
| 2002/0184213 A1 | 12/2002 | Lau et al. | | 2003/0218620 A1 | 11/2003 | Lai et al. |
| 2002/0184219 A1 | 12/2002 | Preisig et al. | | 2003/0220930 A1 | 11/2003 | Milleker et al. |
| 2002/0184401 A1 | 12/2002 | Kadel, Jr. et al. | | 2003/0225469 A1 | 12/2003 | DeRemer et al. |
| 2002/0184485 A1 | 12/2002 | Dray et al. | | 2003/0225768 A1 | 12/2003 | Chaudhuri |
| 2002/0188597 A1 | 12/2002 | Kern et al. | | 2003/0225829 A1 | 12/2003 | Pena et al. |
| 2002/0188613 A1 | 12/2002 | Chakraborty et al. | | 2003/0226111 A1 | 12/2003 | Wirts et al. |
| 2002/0194219 A1 | 12/2002 | Bradley et al. | | 2003/0226132 A1 | 12/2003 | Tondreau et al. |
| 2002/0194388 A1* | 12/2002 | Boloker et al. ............... 709/310 | | 2003/0233374 A1 | 12/2003 | Spinola et al. |
| 2002/0196281 A1 | 12/2002 | Audleman et al. | | 2003/0233644 A1 | 12/2003 | Cohen et al. |
| 2002/0196288 A1 | 12/2002 | Emrani | | 2003/0236859 A1 | 12/2003 | Vaschillo et al. |
| 2002/0198891 A1 | 12/2002 | Li et al. | | 2003/0236903 A1 | 12/2003 | Piotrowski |
| 2002/0198935 A1 | 12/2002 | Crandall, Sr. et al. | | 2003/0237046 A1 | 12/2003 | Parker et al. |
| 2003/0004951 A1 | 1/2003 | Chokshi | | 2003/0237047 A1 | 12/2003 | Borson |
| 2003/0007000 A1 | 1/2003 | Carlson et al. | | 2004/0002939 A1 | 1/2004 | Arora |
| 2003/0014397 A1 | 1/2003 | Chau et al. | | 2004/0002950 A1 | 1/2004 | Brennan et al. |
| 2003/0018668 A1 | 1/2003 | Britton et al. | | 2004/0003031 A1 | 1/2004 | Brown et al. |
| 2003/0020746 A1 | 1/2003 | Chen et al. | | 2004/0003341 A1 | 1/2004 | alSafadi et al. |
| 2003/0023641 A1 | 1/2003 | Gorman et al. | | 2004/0003353 A1 | 1/2004 | Rivera et al. |
| 2003/0023953 A1* | 1/2003 | Lucassen et al. ............... 717/106 | | 2004/0003389 A1 | 1/2004 | Reynar et al. |
| 2003/0025693 A1 | 2/2003 | Haley | | 2004/0006744 A1 | 1/2004 | Jones et al. |
| 2003/0025732 A1 | 2/2003 | Prichard | | 2004/0010752 A1 | 1/2004 | Chan et al. |
| 2003/0026507 A1 | 2/2003 | Zlotnick | | 2004/0010753 A1 | 1/2004 | Salter |
| 2003/0028550 A1 | 2/2003 | Lee et al. | | 2004/0015778 A1 | 1/2004 | Britton et al. |
| 2003/0029911 A1 | 2/2003 | Kitayama | | 2004/0015783 A1 | 1/2004 | Lennon et al. |
| 2003/0033037 A1 | 2/2003 | Yuen et al. | | 2004/0024842 A1 | 2/2004 | Witt |
| 2003/0037021 A1 | 2/2003 | Krothappalli et al. | | 2004/0030991 A1 | 2/2004 | Hepworth et al. |
| 2003/0037303 A1 | 2/2003 | Bodlaender | | 2004/0039881 A1 | 2/2004 | Shoebridge et al. |
| 2003/0038788 A1 | 2/2003 | Demartines et al. | | 2004/0039990 A1 | 2/2004 | Bakar et al. |
| 2003/0038846 A1 | 2/2003 | Hori et al. | | 2004/0039993 A1 | 2/2004 | Kougiouris et al. |
| 2003/0043986 A1 | 3/2003 | Creamer | | 2004/0044961 A1 | 3/2004 | Pesenson |
| 2003/0046665 A1 | 3/2003 | Ilin | | 2004/0044965 A1 | 3/2004 | Toyama et al. |
| 2003/0048301 A1 | 3/2003 | Menninger | | 2004/0046787 A1 | 3/2004 | Henry et al. |
| 2003/0051243 A1 | 3/2003 | Lemmons et al. | | 2004/0046789 A1 | 3/2004 | Inanoria |
| 2003/0055811 A1 | 3/2003 | Stork et al. | | 2004/0054966 A1 | 3/2004 | Busch et al. |
| 2003/0055828 A1 | 3/2003 | Koch et al. | | 2004/0059754 A1 | 3/2004 | Barghout et al. |
| 2003/0056198 A1 | 3/2003 | Al-Azzawe | | 2004/0073565 A1 | 4/2004 | Kaufman et al. |
| 2003/0058286 A1 | 3/2003 | Dando | | 2004/0073868 A1 | 4/2004 | Easter et al. |
| 2003/0061386 A1 | 3/2003 | Brown | | 2004/0078756 A1 | 4/2004 | Napper et al. |
| 2003/0061567 A1 | 3/2003 | Brown et al. | | 2004/0083426 A1 | 4/2004 | Sahu |
| 2003/0069881 A1 | 4/2003 | Huttunen | | 2004/0088647 A1 | 5/2004 | Miller et al. |
| 2003/0074279 A1 | 4/2003 | Viswanath | | 2004/0088652 A1 | 5/2004 | Abe et al. |
| 2003/0084424 A1 | 5/2003 | Reddy et al. | | 2004/0093596 A1 | 5/2004 | Koyano |
| 2003/0093755 A1 | 5/2003 | O'Carroll | | 2004/0107367 A1 | 6/2004 | Kisters |
| 2003/0101414 A1* | 5/2003 | Liu et al. ............... 715/513 | | 2004/0117769 A1 | 6/2004 | Lauzon et al. |
| 2003/0110443 A1 | 6/2003 | Yankovich et al. | | 2004/0123277 A1 | 6/2004 | Schrader et al. |
| 2003/0120578 A1* | 6/2003 | Newman ............... 705/36 | | 2004/0128296 A1 | 7/2004 | Krishnamurthy et al. |
| 2003/0120651 A1 | 6/2003 | Bernstein et al. | | 2004/0139400 A1 | 7/2004 | Allam et al. |
| 2003/0120659 A1 | 6/2003 | Sridhar | | 2004/0146199 A1 | 7/2004 | Berkner et al. |

| | | | | | | |
|---|---|---|---|---|---|---|
| 2004/0148178 A1 | 7/2004 | Brain | | 2005/0210263 A1 | 9/2005 | Levas et al. |
| 2004/0148514 A1 | 7/2004 | Fee et al. | | 2005/0223063 A1 | 10/2005 | Chang et al. |
| 2004/0148571 A1 | 7/2004 | Lue | | 2005/0223320 A1 | 10/2005 | Brintzenhofe et al. |
| 2004/0162741 A1 | 8/2004 | Flaxer et al. | | 2005/0234890 A1 | 10/2005 | Enzler et al. |
| 2004/0163041 A1 | 8/2004 | Engel | | 2005/0240876 A1 | 10/2005 | Myers et al. |
| 2004/0163046 A1 | 8/2004 | Chu et al. | | 2005/0246304 A1 | 11/2005 | Knight et al. |
| 2004/0172442 A1 | 9/2004 | Ripley | | 2005/0257148 A1 | 11/2005 | Goodman et al. |
| 2004/0181543 A1 | 9/2004 | Wu et al. | | 2005/0262112 A1 | 11/2005 | Moore |
| 2004/0181711 A1 | 9/2004 | Johnson et al. | | 2005/0268217 A1 | 12/2005 | Garrison |
| 2004/0186762 A1 | 9/2004 | Beaven et al. | | 2005/0268222 A1 | 12/2005 | Cheng |
| 2004/0189708 A1 | 9/2004 | Larcheveque et al. | | 2006/0010386 A1 | 1/2006 | Khan |
| 2004/0189716 A1 | 9/2004 | Paoli et al. | | 2006/0020586 A1 | 1/2006 | Prompt et al. |
| 2004/0194035 A1 | 9/2004 | Chakraborty | | 2006/0026500 A1 | 2/2006 | Qa 'Im-maqami' |
| 2004/0196266 A1 | 10/2004 | Matsuura et al. | | 2006/0026534 A1 | 2/2006 | Ruthfield et al. |
| 2004/0199572 A1 | 10/2004 | Hunt et al. | | 2006/0031757 A9 | 2/2006 | Vincent |
| 2004/0205473 A1 | 10/2004 | Fisher et al. | | 2006/0036995 A1 | 2/2006 | Chickles et al. |
| 2004/0205525 A1 | 10/2004 | Murren et al. | | 2006/0041838 A1 | 2/2006 | Khan |
| 2004/0205534 A1 | 10/2004 | Koelle | | 2006/0059107 A1 | 3/2006 | Elmore et al. |
| 2004/0205571 A1 | 10/2004 | Adler et al. | | 2006/0059434 A1 | 3/2006 | Boss et al. |
| 2004/0205592 A1 | 10/2004 | Huang | | 2006/0069605 A1 | 3/2006 | Hatoun |
| 2004/0205605 A1 | 10/2004 | Adler et al. | | 2006/0069985 A1 | 3/2006 | Friedman et al. |
| 2004/0205644 A1* | 10/2004 | Shaughnessy et al. ....... 715/530 | | 2006/0075245 A1 | 4/2006 | Meier |
| 2004/0205653 A1 | 10/2004 | Hadfield et al. | | 2006/0080657 A1 | 4/2006 | Goodman |
| 2004/0205671 A1 | 10/2004 | Sukehiro et al. | | 2006/0085409 A1 | 4/2006 | Rys et al. |
| 2004/0210599 A1 | 10/2004 | Friedman et al. | | 2006/0101037 A1 | 5/2006 | Brill et al. |
| 2004/0210645 A1 | 10/2004 | Kouznetsov et al. | | 2006/0101051 A1 | 5/2006 | Carr et al. |
| 2004/0216084 A1 | 10/2004 | Brown et al. | | 2006/0107206 A1 | 5/2006 | Koskimies |
| 2004/0221238 A1 | 11/2004 | Cifra et al. | | 2006/0129583 A1 | 6/2006 | Catorcini et al. |
| 2004/0221245 A1 | 11/2004 | Chickles et al. | | 2006/0129978 A1 | 6/2006 | Abriani et al. |
| 2004/0237030 A1 | 11/2004 | Malkin | | 2006/0136422 A1 | 6/2006 | Matveief et al. |
| 2004/0260593 A1 | 12/2004 | Abraham-Fuchs et al. | | 2006/0143220 A1 | 6/2006 | Spencer |
| 2004/0261019 A1 | 12/2004 | Imamura et al. | | 2006/0155857 A1 | 7/2006 | Feenan et al. |
| 2004/0268229 A1 | 12/2004 | Paoli et al. | | 2006/0161559 A1 | 7/2006 | Bordawekar et al. |
| 2004/0268259 A1 | 12/2004 | Rockey et al. | | 2006/0161837 A1 | 7/2006 | Kelkar et al. |
| 2004/0268260 A1 | 12/2004 | Rockey et al. | | 2006/0173865 A1 | 8/2006 | Fong |
| 2005/0004893 A1 | 1/2005 | Sangroniz | | 2006/0184393 A1 | 8/2006 | Ewin et al. |
| 2005/0005248 A1 | 1/2005 | Rockey et al. | | 2006/0195413 A1 | 8/2006 | Davis et al. |
| 2005/0015279 A1 | 1/2005 | Rucker | | 2006/0200754 A1 | 9/2006 | Kablesh et al. |
| 2005/0015732 A1 | 1/2005 | Vedula et al. | | 2006/0203081 A1 | 9/2006 | Pulitzer |
| 2005/0022115 A1 | 1/2005 | Baumgartner et al. | | 2006/0248468 A1 | 11/2006 | Constantine et al. |
| 2005/0027757 A1 | 2/2005 | Kiessig et al. | | 2007/0005611 A1 | 1/2007 | Takasugi et al. |
| 2005/0028073 A1 | 2/2005 | Henry et al. | | 2007/0036433 A1 | 2/2007 | Teutsch |
| 2005/0033626 A1 | 2/2005 | Kruse et al. | | 2007/0050719 A1 | 3/2007 | Lui et al. |
| 2005/0033728 A1 | 2/2005 | James | | 2007/0061467 A1 | 3/2007 | Essey |
| 2005/0038711 A1 | 2/2005 | Marlelo | | 2007/0061706 A1 | 3/2007 | Cupala |
| 2005/0050066 A1 | 3/2005 | Hughes | | 2007/0074106 A1 | 3/2007 | Ardeleanu |
| 2005/0055627 A1 | 3/2005 | Lloyd et al. | | 2007/0088554 A1 | 4/2007 | Harb et al. |
| 2005/0060324 A1 | 3/2005 | Johnson et al. | | 2007/0094589 A1 | 4/2007 | Paoli |
| 2005/0060647 A1 | 3/2005 | Doan et al. | | 2007/0100877 A1 | 5/2007 | Paoli |
| 2005/0060721 A1 | 3/2005 | Choudhary et al. | | 2007/0101280 A1 | 5/2007 | Paoli |
| 2005/0065933 A1 | 3/2005 | Goering | | 2007/0118538 A1 | 5/2007 | Ahern et al. |
| 2005/0065936 A1 | 3/2005 | Goering | | 2007/0118803 A1 | 5/2007 | Walker et al. |
| 2005/0066287 A1 | 3/2005 | Tattrie et al. | | 2007/0130500 A1 | 6/2007 | Rivers-Moore et al. |
| 2005/0071752 A1 | 3/2005 | Marlatt | | 2007/0130504 A1 | 6/2007 | Betancourt et al. |
| 2005/0076022 A1 | 4/2005 | Wu et al. | | 2007/0186157 A1 | 8/2007 | Walker et al. |
| 2005/0076049 A1 | 4/2005 | Qubti et al. | | 2007/0208606 A1 | 9/2007 | MacKay et al. |
| 2005/0080801 A1 | 4/2005 | Kothandaraman et al. | | 2007/0208769 A1 | 9/2007 | Boehm et al. |
| 2005/0091285 A1 | 4/2005 | Krishnan et al. | | 2007/0276768 A1 | 11/2007 | Pallante |
| 2005/0091305 A1 | 4/2005 | Lange et al. | | 2008/0021916 A1 | 1/2008 | Schnelle et al. |
| 2005/0097536 A1 | 5/2005 | Bernstein et al. | | 2008/0027896 A1 | 1/2008 | Anjur |
| 2005/0102370 A1 | 5/2005 | Lin et al. | | 2008/0028340 A1 | 1/2008 | Davis |
| 2005/0102612 A1 | 5/2005 | Allan et al. | | 2008/0040635 A1 | 2/2008 | Larcheveque |
| 2005/0108624 A1 | 5/2005 | Carrier | | 2008/0052287 A1 | 2/2008 | Stanciu |
| 2005/0114757 A1 | 5/2005 | Sahota et al. | | 2008/0126402 A1 | 5/2008 | Sitchi et al. |
| 2005/0114764 A1 | 5/2005 | Gudenkauf et al. | | 2008/0134162 A1 | 6/2008 | James |
| 2005/0132043 A1 | 6/2005 | Wang et al. | | 2008/0162498 A1 | 7/2008 | Omoigui |
| 2005/0132196 A1 | 6/2005 | Dietl | | 2008/0189335 A1 | 8/2008 | Sikchi |
| 2005/0138031 A1 | 6/2005 | Wefers | | 2008/0222514 A1 | 9/2008 | Rivers-Moore |
| 2005/0138086 A1 | 6/2005 | Pecht-Seibert | | 2009/0044103 A1 | 2/2009 | Chalecki et al. |
| 2005/0138539 A1 | 6/2005 | Bravery et al. | | 2009/0070411 A1 | 3/2009 | Chang et al. |
| 2005/0149375 A1 | 7/2005 | Wefers | | 2009/0119580 A1 | 5/2009 | Rohrabaugh et al. |
| 2005/0149726 A1 | 7/2005 | Joshi et al. | | 2009/0138389 A1 | 5/2009 | Barthel |
| 2005/0159136 A1 | 7/2005 | Rouse et al. | | 2009/0177961 A1 | 7/2009 | Fortini |
| 2005/0160398 A1 | 7/2005 | Bjornson et al. | | 2010/0125778 A1 | 5/2010 | Kelkar |
| 2005/0171746 A1 | 8/2005 | Thalhammer-Reyero | | 2010/0229110 A1 | 9/2010 | Rockey et al. |
| 2005/0183006 A1 | 8/2005 | Rivers-Moore et al. | | | | |
| 2005/0198086 A1 | 9/2005 | Moore et al. | | | FOREIGN PATENT DOCUMENTS | |
| 2005/0198125 A1 | 9/2005 | Macleod Beck et al. | | EP | 0961197 | 12/1999 |
| 2005/0198247 A1 | 9/2005 | Perry et al. | | EP | 1076290 | 2/2001 |

| | | |
|---|---|---|
| EP | 1221661 | 7/2002 |
| JP | 63085960 | 4/1988 |
| JP | 401173140 | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 08263246 | 10/1996 |
| JP | 08263247 | 10/1996 |
| JP | 09016801 | 1/1997 |
| JP | 09134273 | 5/1997 |
| JP | 09190327 | 7/1997 |
| JP | 09251370 | 9/1997 |
| JP | 09292967 | 11/1997 |
| JP | 10011255 | 1/1998 |
| JP | 10097559 | 4/1998 |
| JP | 10171662 | 6/1998 |
| JP | 10207805 | 8/1998 |
| JP | 10232754 | 9/1998 |
| JP | 10240434 | 9/1998 |
| JP | 10260765 | 9/1998 |
| JP | 3191429 | 1/2000 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |
| WO | WO0157720 | 8/2001 |

OTHER PUBLICATIONS

Laura Acklen & Read Gilgen, "Using corel Wordperfect 9", 251-284, 424-434, 583-586 (1998).

LeBlond et al, "PC Magazine Guide to Quattro Pro for Windows", pp. 9-11, 42-61, Ziff-Davis Press, Copyright 1993 by the LeBlond Group.

Microsoft Visual Basic 5.0 Programmer's Guide 1997; pp. 578-579;Redmond WA 98052-6399.

Excel 97 for Busy People Published by Osborne/Mcgraw-Hill 1997 pp. 48-50.

"Architecture for a Dynamic Information Area Control" IBM Technical Disclosure Bulletin IBM Corp. New York US vol. 37 No. 10 Jan. 10, 1994. pp. 245-246.

"Netscape Communicator's Collapsible Toolbars" CHI'98 Human Factors in Computing Systems Conference Proceedings Los Angeles CA Apr. 18-23, 1998 pp. 81-86.

Barker et al., "Creating In-Line Objects Within An Integrated Editing Environment," IBM Technical Disclosure Bulletin, vol. 27, No. 5, Oct. 1984, p. 2962.

"Flexible Information Presentation with XML" 1998 The Institution of Electrical Engineers 6 pages.

Berg A., "Naming and Binding: Monikers" Inside OLE, 1995, Chapter 9, pp. 431-490.

"XKvalidator: A Constraint Validator for XML" CIKM '-2 Nov. 4-9, 2002 Copyright 2002 ACM 1-58113-492-04/02/0011 pp. 446-452.

"Designing Valid XML Views" ER 2002 LNCS 2503 2002 Springer-Verlag Berlin Heidelberg 2002 pp. 463-477.

Efficient Management of Multiversion Documents by Object Referencing Proceedings of the 27th VLDB Conference 2001 pp. 291-300.

"Efficient schemes for managing mulitversion XML documents" VLDB Journal (2002) pp. 332-352.

"Storing and Querying Multiversion XML Documents using Durable Node Numbers" IEEE 2002 pp. 232-241.

"XML Document Versioning" SIGMOD Record vol. 30 No. 3 Sep. 2001 pp. 46-53.

"Generic Validation of Structural Content with Parametric Modules" ICFP '01 Sep. 3-5, 2001 Copyright 2001 ACM 1-58113-415-0/01/0009 pp. 98-109.

"Managing Complex Documents Over the WWW: A Case Study for XML" IEEE Transactions on Knowledge and Data Engineering Vo.l. 11 No. 4 Jul./Aug. 1999. pp. 629-938.

Clapp D., "The NeXT Application Kit Part I: Non-Responsive Classes," The NeXT Bible 1990, Chapter 16, pp. 275-293.

Clark James—W3C Editor; "XSL Transformation (XSLT) Verison 1.0" Nov. 16, 1999 W3C (MIT INRIA Kejo) pp. 1-156.

W3C Editor James Clark and Ste; "XML Path Language (XPath) Version 1.0" Nov. 16, 1999 W3C (MIT INRIA Kejo) pp. 1-49.

"From small beginnings" Knowledge Management Nov. 2001 pp. 28-30.

"Photo Shop 5/5.5 WOW! Book" 2000 Peachpit Press pp. 8-17.

Description of Whitehill Composer software product producted by Whitehill Technologies Inc. available at <http://www.xml.com/pub/p/221> accessed on Apr. 8 2004, two pages.

DiLascia et al., "Sweeper" Microsoft Interactive Developer, vol. 1, No. 1, 1996, 27 pages.

"XML Spy Tops as XML Editor" http://www.eweek.com/article2/0395972404100.asp Nov. 25, 2002 4 pages.

"Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.

"Mapping and Displaying Structural Transformations between XML and PDF" DocEng '02 Nov. 8-9, 2002 Copyright 2002 ACM 1-58113-597-07/02/0011 pp. 95-102.

Herzner et al., "CDAM—Compound Document Access and Management. An Object-Oriented Approach" Multimedia Systems Interaction and Applications, 1992, Chapter 3, pp. 17-36.

"Micro-Firewalls for Dynamic Network Security with Distributed Intrusion Detection"; IEEE INternational Symposium on Network Computing and Applications; 2001; pp. 68-79.

"Specifying Runtime Environments and Functionalities of Downloadable Components Under the Sandbox Mode"; International Symposium on Principles of Software Evolution; 2000; pp. 138-142.

"An Efficiently Updatable Index Scheme for Structured Documents" 1998 IEEE pp. 991-996.

"Immediate and Partial Validation Mechanism for the Conflict Resolution of Update Operations in XML Databases" WAIM 2002 LNCS 2419 2002 pp. 387-396 Springer-Veriag Berlin Heidelberg 2002.

Kobayashi et al., "An Update on BTRON-specification OS Development" IEEE 1991, pp. 132-140.

Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.

Musgrave S; "Networking technology—impact and opportunities" Survey and Statistical Computing 1996. Proceedings of the Second ASC International Conference. Sep. 1996. pp. 369-378. London UK.

"Validation with MSXML and XML Schema" Windows Developer Magazine Jan. 2002 pp. 35-38.

"SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

"A secure conditional access system using digital signature and encryption" 2003 Digest of Technical Papers. International Conference on Consumer Electronics Jun. 2003 pp. 220-221.

Object Management Group, XML Metadata Interchange (XMI) Specification Version 1.2 Jan. 2002.

"Delphi 5 Developer's Guide" Sams Publishing 1999 Chapter 31 Section: Data Streaming 6 pages.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Prevelakis et al., "Sandboxing Applications"; Proceedings of the FREENIX Track; 2001; pp. 119-126.

Rapaport L; "Get more from SharePoint" Transform Magazine vol. 11 No. 3. Mar. 2002 pp. 1315.

"Validating MPEG-21 Encapsulated Functional Metadata" IEEE 2002 pp. 209-212.

Schmid et al., "Protecting Data from Malicious Software"; 18th Annual Computer Security Applications Conference; 2002; pp. 199-208.

Staneck W., "Internal and External Media" Electronic Publishing Unleashed, 1995, Chapter 22, pp. 510-542.
"Store and Organize Related Project Files in a Binder," Getting Results with Microsoft Office, 1990, pp. 109-112.
Sun Q. et al., "A robust and secure media signature scheme for JPEG images" Proceedings of 2002 IEEE Workshop on Multimedia Signal Processing, Dec. 2002, pp. 296-299.
"An Efficient and Flexible Access Control Framework for Java Programs in Mobile Terminals"; 22nd International Conference on Distributed Computing Systems Workshops; 2002; pp. 777-782.
Trupin J., "The Visual Programmer," Microsoft Systems Journal, Apr. 1996, pp. 103-105.
"XML: Not a Silver Bullet But a Great Pipe Wrench" Standardview vol. 6. No. 3 Sep. 1998 pp. 125-132.
"The Open Software Description Format" Online Aug. 13, 1997 retrieved from the Internet on Nov. 7, 2003: <http://www.w3.org/TR/NOTE-OSD> 11 pages.
"Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.
"The Component Object Model" A Technical Overview Oct. 1994 Microsoft Corp. pp. 1-14.
"Managing and Querying Multi-Version XML Data with Update Logging" DocEng '02 Nov. 8-9, 2002 Copyright 2002 ACM 1-58113-594-07/02/0011 pp. 74-81.
Zdonik S., "Object Management System Concepts," ACM, 1984, pp. 13-19.
Han et al., WebSplitter: A Unified XML Framework for Multi-Device Collaborative Web Browsing, 2000, ACM Conference on Cimputer Supported Cooperative Work, 10 pages.
IBM: Stack Algorithm for Extractin Subtree from Serialized Tree, Mar. 1, 1994, TDB-ACC-NONN94033, 3 pages.
"Microsoft Word 2000 Screenshots", (2000),11-17.
XMLSPY, "XmlSpy 2004 Enterprise Edition Manual", Altova,(May 17, 2004),1-25, 220-225.
StylusStudio, "StylusStudio: XPath Tools", 2004-2007, StylusStudio,1-14.
Dodds, "Toward an XPath API", xml.com,(May 7, 2001),1-3.
Altova, "Altova Tools for XPath 1.0/2.0", Altova,1-12.
"Microsoft Word 2000 Screenshots", Word,(2000),1-17.
Grosso, et al., "XML Fragment Interchange", W3C,(Feb. 2001),1-28.
Altova, et al., "User and Reference Manual Version 4.4", www.xmlspy.com, (May 24, 2007),1-565.
Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.
"Webopedia Computer Dictionary" retrieved on May 9, 2006, at <<http://www.pewebopedia.com/TERM/O/OLE.html>>, Jupitermedia Corporation, 2006, pp. 07.
Anat, Eyal et al., "Integrating and Customizing Hererogeneous E-Commerce Applications", The VLDB Journal-The International Journal on Very Large Data Bases, vol. 10, Issue 1,(Aug. 2001),16-38.
Adams, Susie et al., "BizTalk Unleashed", Sams publishing, 2002, first printing Mar. 2001,1-2, 31-138.
Vasters, Clemens F., "BizTalk Server 2000 A Beginner's Guide", Osborne/McGraw-Hill,(2001),1-2, 359-402.
Halberg, Bruce et al., "Using Microsoft Excel 97", (1997),191-201, 213-219.
Villard, et al., "An Incremental XSLT Transformation Processor for XML Document Manipulation", http://www2002.org/CDROM/refereed/321, Printed on May 18, 2007,25 pages.
Hu, et al., "A Programmable Editor for Developing Structured Documents based on Bidirectional Transformations", ACM,(Aug. 2004),178-179.
"Microsoft Visual Basic 5.0 Programmer's Guide", *Microsoft Press*, (1997),pp. 42-43, 54-58.
"Microsoft Word 2000", Screenshots,(1999), 1-5.
Borland, Russo , "Running Microsoft Word 97", 314-315, 338, 361-362, 390, and 714-719.

Brabrand, et al., "Power Forms Declarative Client-side Form Field Validation", (2002),1-20.
Altova, Inc., "XML Spy 4.0 Manual," Altova Inc. & Altova GmbH, coyright 1998-2001, Chapters 1, 2, and 6, encompassing pp. 1-17, 18-90, and 343-362.
Excel Developer Tip (hereinafter "Excel"), "Determining the Data Type of a Cell", May 13, 1998, p. 1 (available at http://jwalk.com/ss//excel/tips/tip62.htm).
Bradley, Neil "The XML Companion, Third Edition", *Published by Addison Wesley Professional*, http://proquest.safaribooksonline.com0201770598, http,(Dec. 12, 2001),1-18.
Klarlund, Nils "DSD: A Schema Language for XML", *ACM, FSMP* Portland Oregon, (2000),101-111.
Watt, Andrew "MIcrosoft Office Infopath 2003 Kick Start", (Published by Sams) Print ISBN-10:0-672-32623-X, (Mar. 24, 2004),1-57.
Atova, "User Reference manual Version 4.4, XML Spy suite 4.4," Atova Ges.m.b.H and Altova, Inc., May 24, 2002, pages cover, copyright page, 1-565.
Altova et al. XML Spy, XML integrated Development Environments, Altova Inc., 2002, pp. 1-18.
Ben-Natan, U.S. Appl. No. 60/203,081, filed May 9, 2000, entitled "Internet platform for creating and supporting communities".
Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.
Kutay, U.S. Appl. No. 60/209,713, filed Jun. 5, 2000, entitled, "Methods and systems for accessing, organizing presenting and viewing data".
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, U.S. Appl. No. 60/191,662, filed Mar. 23, 2000, entitled "Collection-based presistent digital archives".
Microsoft Corporation, "Microsoft Computer Dictionary" Microsoft Press, Fifth Edition, p. 149.
Pacheco, Xavier et al., "Delphi 5 Developer's Guide", Sams Publishing. Chapter 31, Section: Data Streaming,(1999),4.
Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003),6 pages.
Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004),12 pages.
Dubinko, Micah "XForms and Microsoft InfoPath", Retrieved from the Internet at http://www.xml.com/lpt/a/1311 on Jan. 21, 2007,(Oct. 29, 2003),6 pages.
Udell, Jon "InfoPath and XForms", Retrieved from the Internet at http://weblog.infoworld.com/udell/2003/02/26.html,(Feb. 26, 2003),3 pages.
Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003),6 pages.
Singh, Darshan "Microsoft InfoPath 2003 by Example", Retrieved from the Internet at http://www.perfectxml.com/InfoPath.asp on Jan. 21, 2007,(Apr. 20, 2003),19 pages.
"Enter Key", Retrieved from the Internet at http://systems.webopedia.com/TERM/Enter_key.html on Dec. 20, 2006, 1 page.
Lehtonen, Miro et al., "A Dynamic User Interface for Document Assembly", Department of Computer Science, University of Helsinki,(Nov. 2002),8 pages.
Rees, Michael J., "Evolving the Browser Towards a Standard User Interface Architecture", School of Information Technology, Bond University, Australia,(2001),7 page4s.
Nelson, Joe "Client-side Form Validation Using JavaScript", *Developer Advisory*, (Sep. 21, 2001),10 pages.
"XForm 1.0", W3C,(Jul. 16, 2001),179 pages.

"XML Forms Architecture (XFA)", Retrieved from http://xml.coverpages.org/xfa.html on Aug. 17, 2006, Cover Pages Technology Reports,,(Jun. 16, 1999),p. 1.

McCright, J.S. "New Tool kit to Link Groove with Microsoft SharePoint", eWeek, Enterprise News & Reviews, Ziff Davis Media Inc. Retreived from <http://www.eweek.com/c/a/Enterprise-Applications/New-Tool-Kit-to-Link-Groove-With-Microsoft-SharePoint/>,(Jul. 29, 2002),p. 1.

"Dreamweaver Technote: Changes in copying and pasting in Dreamweaver 4", http://store1.adobe.com/cfusion/knowledgebase/index.cfm?id=tn_15152, (Mar. 2001),pp. 1-2.

"How to create a template that makes it easy for users to 'fill in the blank' withough doing any programming,", Retrieved from http://word.mvps.org/FAQs/Customization/FillinTheBlanks.htm, (Apr. 2004),pp. 1-2.

Sutanthavibul, Supoj et al., "XFIG version 3.2 Patchlevel 2 (Jul. 2, 1998) Users Manual (Edition 1.0)", Retrieved from www.ice.mtu.edu/online_docs/sfig332/ on Jan. 28, 2003, Internet Document XP002229137,(Feb. 7, 1998),pp. 1-66.

Alschuler, Liora "A tour of XMetal", Retrieved from http://www.xml.com/pub/a/SeyboldReport/ip031102.html on Feb. 5, 2003, XML.com, Online! XPOO2230081,(Jul. 14, 1999),3 pages.

Davidow, Ari "XML Editors: Allegations of Functionality in search of Reality", Retrieved from www.ivritype.com/xml/, SP002230082 (1999),pp. 1-16.

Brogden, William "Arbortext Adept 8 Editor Review", Retrieved from www.xml.com/pub/a/1999/09/adept/AdeptRvw.htm on Feb. 5, 2003, O'Reilly XML.COM, Online!,(Sep. 22, 1999),pp. 1-4.

Haukeland, Jan-Henrick "Tsbiff-tildeslash biff—version 1.2.1", http://web.archive.org/web/19990912001527/http://www.tildeslash.com/tsbiff/., (Jun. 1999),pp. 1-2.

Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.

Kay, Michael "XSL Transfornmations (XSLT) Version 2.0", http://www.w3.org/TR/2005/WD-xslt20-20050404, (04/205),1-374.

"Non Final OA", U.S. Appl. No. 10/939,588, (Feb. 18, 2009),40 pages.

"Notice of Allowance", U.S. Appl. No. 10/404,312, (Jan. 12, 2009),12 pages.

"Final Office Action", U.S. Appl. No. 10/857,689, (Jan. 6, 2009),23 pages.

"Non Final Office Action", U.S. Appl. No. 10/977,198, (Feb. 2, 2009),15 pages.

"Non Final Office Action", U.S. Appl. No. 10/939,588, (Feb. 18, 2009),40 pages.

"Non Final Office Action", U.S. Appl. No. 10/976,451, (Feb. 23, 2009),39 pages.

"Notice of Allowance", U.S. Appl. No. 11/167,514, (Mar. 11, 2009),6 pages.

"Non Final Office Action", U.S. Appl. No. 10/942,528, (Mar. 6, 2009),31 pages.

"Non Final Offfice Action", U.S. Appl. No. 11/170,521, (Jan. 21, 2009),86 pages.

"Foreign Office Action", Application Serial No. 2,412,611, (Feb. 9, 2009),6 pages.

"Foreign Office Action", Application Serial No. 200610003709.2, (Jan. 9, 2009),8 pages.

"EP Office Action", Application Serial No. 06111546.5, (Oct. 15, 2008),5 pages.

"Notice of Re-Examination", Application Serial No. 01813138.7, (Mar. 11, 2009),27 pages.

"Notice of Allowance", U.S. Appl. No. 10/988,718, (Apr. 9, 2009).

"Final Office Action", U.S. Appl. No. 11/107,347, (Apr. 2, 2009),15 pages.

"Restriction Requirement", U.S. Appl. No. 11/227,550, (Apr. 2, 2009),8 pages.

"Non Final Office Action", U.S. Appl. No. 10/955,665, (Apr. 2, 2009),19 pages.

"Non Final Office Action", U.S. Appl. No. 10/988,720, 19 pages.

"Final Office Action", U.S. Appl. No. 11/203,818, (Apr. 14, 2009),31 pages.

"Final Office Action", U.S. Appl. No. 11/044,106, (Apr. 13, 2009),20 pages.

"Final Office Action", U.S. Appl. No. 11/226,044, (Apr. 20, 2009),24 pages.

"Final Office Action", U.S. Appl. No. 11/056,500, (Apr. 16, 2009),10 pages.

Raman, T. V., et al., "XForms 1.0", (Dec. 2001),64 pages, Section 1-12.2.3 & Appendices A-G.

Hall, Richard S., "Agent-based Software Configuration and Development", http://www.doc.ic.ac.uk/~alw/edu/theses/hall-phd-0599.pdf on Jun. 8, 2009, Thesis of the University of Colorado,(May 1, 1999),182 pages.

"Copying the Search Form to Custom Pages in Windows SharePoint Services-based Web Sites", Retrieved from <www.sharepointcustomization.com/resources/tipstricks/04wss-searchbox-tip.htm> on Feb. 11, 2009, Microsoft Corp,(2003),1 page.

Acklen, et al., "Special Edition, Using Corel WordPerfect 9", Que Corporation,,(Jun. 1999),65 pages.

"Netscape Communicator 4.61 for OS/2 Warp", Netscape Communication Corporation, Software 1999, The Whole software release & Netscape—Version 4.61 {en}—010615, Netscape Screenshot,,(Oct. 2, 2002),1.

"Final Office Action", U.S. Appl. No. 11/203,937, (May 7, 2009),8 pages.

"Non Final Office Action", U.S. Appl. No. 10/955,666, (May 7, 2009),24 pages.

"Non Final Office Action", U.S. Appl. No. 10/876,433, (Apr. 24, 2009),24 pages.

"Non Final Office Action", U.S. Appl. No. 10/916,692, (Apr. 30, 2009),9 pages.

"HP Blade Server BH Series Operating System Guide", Hewlett-Packard,(Jul. 2002),69.

"Non Final Office Action", U.S. Appl. No. 09/599,809, (May 13, 2009),17 pages.

"Non Final Office Action", U.S. Appl. No. 11/295,178, (May 27, 2009),29 pages.

"Non Final Office Action", U.S. Appl. No. 10/990,152, (May 28, 2009),16 pages.

"Non Final Office Action", U.S. Appl. No. 10/857,689, (Jun. 11, 2009),20 pages.

"Non Final Office Action", U.S. Appl. No. 11/095,254, (Jun. 8, 2009),8 pages.

"Final Office Action", U.S. Appl. No. 11/234,767, (Jun. 10, 2009),20 pages.

"Foreign Office Action", Application Serial No. 2002-503702, Final Notice of Rejection,(Jun. 5, 2009),211 pages.

Iwantani, Kaori et al., "Perfect Manual of Clarisworks 4.0 for Macintosh", *1st Edition*, Japan, (Jul. 22, 1997),pp. 153-167.

Matsushita, Noriko "Step-up Training of Clarisworks (Tabulation), Successful Use of Spreadsheet and Tabulation", *Mac People*, vol. 4, No. 19, (Oct. 1, 1998),pp. 138-139.

Senda, Akihiro "Word 2000, Conservative-Looking but 'Attentive' New Function", *Nikkei PC 21*, vol. 4, No. 8; Japan, (Aug. 1, 1999),pp. 115-116.

Fukuhara, Yasuji "Clarisworks, Introduction to Business Document Construction, No. 4, Estimate", *Nikkei MAC*, No. 14; Japan, (May 17, 1994),pp. 197-204.

"Final Office Action", U.S. Appl. No. 10/976,451, (Jul. 2, 2009),13 pages.

Reagan, Moore W., et al., "Collection-based persistent digital archives", U.S. Appl. No. 60/191,662, filed Mar. 23, 2000, 133.

"Non-Final Office Action", U.S. Appl. No. 11/227,550, (Aug. 3, 2009),10 pages.

"Notice of Allowance", U.S. Appl. No. 11/203,937, (Aug. 3, 2009),7 pages.

"Foreign Office Action", Application Serial No. 200610051554.X, (Jul. 10, 2009),11 pages.

"Non-Final Office Action", U.S. Appl. No. 11/234,767, (Aug. 12, 2009),24 Pages.

"Final Office Action", U.S. Appl. No. 10/977,198, (Aug. 19, 2009),15 pages.

"Non-Final Office Action", U.S. Appl. No. 10/939,588, (Aug. 27, 2009),28 pages.

"Final Office Action", U.S. Appl. No. 11/170,521, (Sep. 8, 2009),12 pages.
"Final Office Action", U.S. Appl. No. 10/402,640, (Aug. 28, 2009),17 pages.
"Notice of Allowance", U.S. Appl. No. 11/203,937, Supplemental,(Sep. 15, 2009),2 pages.
"Final Office Action", U.S. Appl. No. 10/942,528, (Sep. 17, 2009),27 pages.
"Non-Final Office Action", U.S. Appl. No. 11/107,347, (Sep. 17, 2009),9 pages.
"Notice of Allowance", U.S. Appl. No. 10/988,720, (Sep. 17, 2009),18 pages.
"Non-Final Office Action", U.S. Appl. No. 11/044,106, (Sep. 24, 2009),17 pages.
"Notice of Allowance", U.S. Appl. No. 11/203,937, (Aug. 31, 2009),2 pages.
"Non-Final Office Action", U.S. Appl. No. 11/567,149, (Sep. 8, 2009),5 pages.
"Final Office Action", U.S. Appl. No. 10/955,666, (Oct. 14, 2009),24 pages.
"Advisory Action", U.S. Appl. No. 10/942,528, (Oct. 26, 2009),3 pages.
"Non-Final Office Action", U.S. Appl. No. 11/557,931, (Oct. 20, 2009),27 pages.
"Non-Final Office Action", U.S. Appl. No. 10/976,451, (Oct. 29, 2009),14 pages.
WEBOPEDIA, "Definition of OLE", Retrieved from: <http://www.webopedia.com/TERM/O/OLE.html>, (May 16, 1998),3 pages.
WEBOPEDIA, "Definition of OpenDoc", Retrieved from: <http://www.webopedia.com/TERM/O/OpenDoc.html>, (Sep. 18, 1997),3 pages.
WEBOPEDIA, "Definition of Network", Retrieved from: <http://www.webopedia.com/TERM/n/network.html>, (Sep. 1, 1996),2 pages.
"Final Office Action", U.S. Appl. No. 11/234,767, (Jan. 26, 2010),23 pages.
"Notice of Allowance", U.S. Appl. No. 11/872,703, (Jan. 27, 2010),19 pages.
"Supplemental Notice of Allowance", U.S. Appl. No. 10/955,665, (Feb. 4, 2010),2 pages.
"Supplemental Notice of Allowance", U.S. Appl. No. 10/955,665, (Nov. 27, 2009),2 pages.
"Final Office Action", U.S. Appl. No. 11/107,347, (Mar. 22, 2010), 11 pages.
"Non-Final Office Action", U.S. Appl. No. 10/916,692, (Apr. 5, 2010), 6 pages.
"Non-Final Office Action", U.S. Appl. No. 10/976,451, (Apr. 9, 2010), 11 pages.
"Non-Final Office Action", U.S. Appl. No. 11/227,550, (Mar. 10, 2010), 12 pages.
"Notice of Allowance", U.S. Appl. No. 10/939,588, (Mar. 10, 2010), 10 pages.
"Notice of Allowance", U.S. Appl. No. 11/044,106, (Mar. 15, 2010), 7 pages.
"Supplemental Notice of Allowance", U.S. Appl. No. 10/955,665, (Mar. 5, 2010), 2 pages.
"Supplemental Notice of Allowance", U.S. Appl. No. 10/990,152, (Apr. 19, 2010), 2 pages.
"Supplemental Notice of Allowance", U.S. Appl. No. 11/072,087, (Apr. 19, 2010), 2 pages.
"Non-Final Office Action", U.S. Appl. No. 10/402,640, (Apr. 30, 2010), 4 pages.
"Final Office Action", U.S. Appl. No. 10/916,692, (Nov. 16, 2009),10 pages.
"Final Office Action", U.S. Appl. No. 11/072,087, (Nov. 16, 2009),9 pages.
"Final Office Action", U.S. Appl. No. 11/218,149, (Nov. 16, 2009),18 pages.
"Final Office Action", U.S. Appl. No. 11/227,550, (Jan. 19, 2010),12 pages.
"Final Office Action", U.S. Appl. No. 11/295,178, (Dec. 24, 2009),38 pages.

"Foreign Office Action", Application Serial No. 200610051544.X, (Dec. 4, 2009),9 pages.
"Foreign Office Action", Mexican Patent Application No. PA/a/2006/002493, (Sep. 14, 2009),5 pages.
"Non-Final Office Action", U.S. Appl. No. 10/402,640, (Dec. 30, 2009),16 pages.
"Non-Final Office Action", U.S. Appl. No. 11/170,521, (Dec. 17, 2009),11 pages.
"Non-Final Office Action", U.S. Appl. No. 11/218,149, (Jan. 14, 2010),15 Pages.
"Non-Final Office Action", U.S. Appl. No. 12/021,894, (Dec. 31, 2009),10 pages.
"Notice of Allowance", U.S. Appl. No. 10/942,528, (Dec. 3, 2009),8 pages.
"Notice of Allowance", U.S. Appl. No. 10/955,665, (Nov. 3, 2009),8 pages.
"Notice of Allowance", U.S. Appl. No. 10/955,665, (Dec. 30, 2009),2 pages.
"Notice of Allowance", U.S. Appl. No. 10/990,152, (Dec. 21, 2009),6 pages.
"Notice of Allowance", U.S. Appl. No. 11/056,500, (Dec. 2, 2009),17 pages.
"Notice of Allowance", U.S. Appl. No. 11/095,254, (Nov. 18, 2009),8 pages.
Honkala, Mikko et al., "Multimodal Interaction with XForms", ICWE '06, (2006),pp. 201-208.
Van Hoff, Arthur et al., "The Open Software Description Format", Retrieved from: <www.w3.org/TR/NOTE-OSD> on May 18, 2009, (Aug. 13, 1997),10 pages.
"Final Office Action", U.S. Appl. No. 11/012,472, (Mar. 23, 2010),10 pages.
"Final Office Action", U.S. Appl. No. 11/170,521, (Jun. 29, 2010),13 pages.
"Final Office Action", U.S. Appl. No. 11/218,149, (May 19, 2010),17 pages.
"Foreign Office Action", Australian Patent Application No. 2006200285, (May 20, 2010),2 pages.
"Foreign Office Action", Chinese Application No. 200610051554.X, (Jun. 25, 2010),10 pages.
"Foreign Office Action", European Patent Application No. 01939368.5, (Feb. 25, 2010),3 pages.
"Foreign Office Action", Russian Application No. 2006103267, (Apr. 20, 2010),10 pages.
"Foreign Office Action", Russian Application No. 2006105526, (Apr. 15, 2010),10 pages.
"Non-Final Office Action", U.S. Appl. No. 11/012,472, (Oct. 6, 2009),8 pages.
"Non-Final Office Action", U.S. Appl. No. 11/012,472, (Jul. 1, 2010),9 pages.
"Non-Final Office Action", U.S. Appl. No. 11/107,347, (Jul. 9, 2010),16 pages.
"Non-Final Office Action", U.S. Appl. No. 11/295,178, (May 26, 2010),45 pages.
"Non-Final Office Action", U.S. Appl. No. 11/567,140, (May 18, 2010),8 pages.
"Notice of Allowance", U.S. Appl. No. 10/402,640, (Jun. 15, 2010),6 pages.
"Notice of Allowance", U.S. Appl. No. 10/916,692, (Jun. 14, 2010),6 pages.
"Notice of Allowance", U.S. Appl. No. 11/557,931, (May 5, 2010),7 pages.
"Notice of Allowance", U.S. Appl. No. 11/872,703, (May 14, 2010),18 pages.
"Restriction Requirement", U.S. Appl. No. 11/012,472, (Jun. 9, 2009),7 pages.
"Supplemental Notice of Allowance", U.S. Appl. No. 11/044,106, (May 13, 2010),6 pages.
"Supplemental Notice of Allowance", U.S. Appl. No. 11/044,106, (May 19, 2010),5 pages.
"European Search Report", EP Application No. 06111546.5, (Nov. 9, 2006),5 pages.
"Final Office Action", U.S. Appl. No. 10/402,640, (Sep. 10, 2007),16 pages.

"Final Office Action", U.S. Appl. No. 10/955,087, (May 16, 2008),13 pages.
"Final Office Action", U.S. Appl. No. 10/955,666, (Oct. 31, 2008),24 pages.
"Final Office Action", U.S. Appl. No. 10/955,666, (Aug. 30, 2007),19 pages.
"Final Office Action", U.S. Appl. No. 10/976,451, (Jul. 27, 2010),12 pages.
"Final Office Action", U.S. Appl. No. 10/977,198, (Sep. 3, 2008),13 pages.
"Final Office Action", U.S. Appl. No. 10/977,198, (Oct. 11, 2007),10 pages.
"Final Office Action", U.S. Appl. No. 10/988,718, (Jan. 30, 2008),15 pages.
"Final Office Action", U.S. Appl. No. 10/988,718, (Dec. 22, 2008),17 pages.
"Final Office Action", U.S. Appl. No. 10/988,732, (Nov. 13, 2009),33 pages.
"Final Office Action", U.S. Appl. No. 10/988,732, (Dec. 10, 2008),29 pages.
"Final Office Action", U.S. Appl. No. 11/227,550, (Aug. 19, 2010),12 pages.
"Final Office Action", U.S. Appl. No. 11/295,178, (Jul. 30, 2010),43 pages.
"Final Office Action", U.S. Appl. No. 11/567,140, (Aug. 19, 2010),10 pages.
"Foreign Office Action", EP Application No. 01935325.9, (Jul. 20, 2010),6 pages.
"Foreign Office Action", Japanese Application No. 2002-530701, (Aug. 10, 2010),11 pages.
"Issue Notification", U.S. Appl. No. 10/955,087, (Mar. 18, 2009),1 page.
"Issue Notification", U.S. Appl. No. 10/988,718, (Aug. 12, 2009),1 page.
"Issue Notification", U.S. Appl. No. 11/095,254, (Feb. 10, 2010),1 page.
"Issue Notification", U.S. Appl. No. 11/276,585, (Jan. 21, 2009),1 page.
"Lotus Notes Release 5, Step by Step", *Lotus Development Corporation*, (1999),224 pages.
"Netscape Window", *Netscape Screenshot*, (Oct. 2, 2002),1 page.
"Non Final Office Action", U.S. Appl. No. 10/402,640, (Oct. 6, 2006),15 pages.
"Non Final Office Action", U.S. Appl. No. 10/402,640, (Feb. 12, 2008),16 pages.
"Non Final Office Action", U.S. Appl. No. 10/402,640, (Apr. 25, 2007),16 pages.
"Non Final Office Action", U.S. Appl. No. 10/402,640, (Sep. 8, 2008),16 pages.
"Non Final Office Action", U.S. Appl. No. 10/955,087, (Nov. 19, 2007),22 pages.
"Non Final Office Action", U.S. Appl. No. 10/955,666, (Dec. 26, 2006),20 pages.
"Non Final Office Action", U.S. Appl. No. 10/955,666, (Feb. 4, 2008),20 pages.
"Non Final Office Action", U.S. Appl. No. 10/977,198, (Jan. 10, 2008),10 pages.
"Non Final Office Action", U.S. Appl. No. 10/977,198, (Mar. 9, 2007),9 pages.
"Non Final Office Action", U.S. Appl. No. 10/988,718, (Jan. 25, 2007),13 pages.
"Non Final Office Action", U.S. Appl. No. 10/988,718, (Jul. 21, 2008),18 pages.
"Non Final Office Action", U.S. Appl. No. 10/988,718, (Jul. 26, 2007),21 pages.
"Non-Final Office Action", U.S. Appl. No. 10/854,961, (Nov. 15, 2006),21 pages.
"Non-Final Office Action", U.S. Appl. No. 10/955,665, (Sep. 11, 2008),16 pages.
"Non-Final Office Action", U.S. Appl. No. 10/988,732, (Apr. 1, 2008),27 pages.
"Non-Final Office Action", U.S. Appl. No. 10/988,732, (May 26, 2010),36 pages.
"Non-Final Office Action", U.S. Appl. No. 10/988,732, (Jun. 11, 2009),30 pages.
"Notice of Allowance", U.S. Appl. No. 10/854,961, (Jun. 14, 2007),12 pages.
"Notice of Allowance", U.S. Appl. No. 10/955,087, (Dec. 11, 2008),10 pages.
"Restriction Requirement", U.S. Appl. No. 10/402,640, (Aug. 29, 2006),5 pages.
Burch, Barbara "Notes R5 Technical Overview", Retrieved from: <http://www.ibm.com/developerworks/lotus/library/1s-Notes_R5_Technical Overview> on Aug. 13, 2010, (Apr. 1, 1999),14 pages.
Esposito, Dino "Cutting Edge No. 8", *Microsoft Internet Developer*, (Jan. 18, 2000),13 pages.
Howlett, Scott "A New Function for SQL Server 2000", *MSDN Magazine*, No. 1, (Apr. 18, 2000),11 pages.
"Foreign Decision of Grant", Russian Application No. 2006105526, (Nov. 8, 2010), 16 pages.
"Foreign Office Action", Canadian Application No. 2408313, (Oct. 26, 2010),5 pages.
"Foreign Office Action", Canadian Application No. 2412611, (Oct. 26, 2010),2 pages.
"Manual of Patent Office Practice", *Computer-Implemented Inventions, Chapter 16.09.02, Data Structures*, (Oct. 20, 2010), 3 pages.
"Non-Final Office Action", U.S. Appl. No. 10/976,451, (Nov. 10, 2010),9 pages.
"Non-Final Office Action", U.S. Appl. No. 11/218,149, (Sep. 20, 2010),15 pages.
"Non-Final Office Action", U.S. Appl. No. 11/234,767, (Nov. 26, 2010),28 pages.
"Non-Final Office Action", U.S. Appl. No. 12/061,613, (Sep. 28, 2010),9 pages.
"Notice of Allowance", U.S. Appl. No. 12/021,894, (Oct. 29, 2010),9 pages.
"About Microsoft Word", Microsoft Word 2000, published 1983-1999, and Microsoft Excel 2000 (see Screen Shot "About Microsoft Excel") Published 1988-1999,(Oct. 21, 2005),3 pages.
"Advisory Action", U.S. Appl. No. 10/898,657, (Mar. 25, 2008),3 pages.
"The Search Form to Services-based Web Sites", *Cybook, INC., the whole document*(Jul. 26, 2004), 1 page.
"Final Office Action", U.S. Appl. No. 09/599,086, (Mar. 6, 2008),47 pages.
"Final Office Action", U.S. Appl. No. 09/599,086, (May 10, 2007),41 pages.
"Final Office Action", U.S. Appl. No. 09/599,086, (May 25, 2004),23 pages.
"Final Office Action", U.S. Appl. No. 09/599,086, (Jul. 5, 2006),34 pages.
"Final Office Action", U.S. Appl. No. 09/599,086, (Aug. 8, 2005),27 pages.
"Final Office Action", U.S. Appl. No. 09/599,299, (Apr. 20, 2004),23 pages.
"Final Office Action", U.S. Appl. No. 09/599,812, (Aug. 12, 2003),38 pages.
"Final Office Action", U.S. Appl. No. 10/178,291, (Dec. 19, 2005),21 pages.
"Final Office Action", U.S. Appl. No. 10/723,188, (Jan. 9, 2009),20 pages.
"Final Office Action", U.S. Appl. No. 10/723,863, (Sep. 19, 2007),34 Pages.
"Final Office Action", U.S. Appl. No. 10/846,428, (Mar. 3, 2008),23 pages.
"Final Office Action", U.S. Appl. No. 10/897,647, (Mar. 6, 2008),25 pages.
"Final Office Action", U.S. Appl. No. 10/897,647, (Jul. 14, 2009),36 pages.
"Final Office Action", U.S. Appl. No. 10/898,656, (Nov. 15, 2007),16 pages.
"Final Office Action", U.S. Appl. No. 10/898,657, (Jan. 3, 2008),21 pages.
"Foreign Decision of Grant", Russian Application No. 2006103267, (Aug. 13, 2010),18 pages.

"Foreign Office Action", European Patent Application No. 01939034.3, (Nov. 5, 2007),3 pages.

"Foreign Office Action", Russian Application No. 2006105526, (Aug. 24, 2010),5 pages..

"Microsoft Computer Dictionary 5th Edition", *Entry for "Stack," Microsoft Press, ISBN 0-7356-1495-4*, (May 1, 2002),p. 495.

"Non Final Office Action", U.S. Appl. No. 09/599,086, (Jan. 30, 2006),33 pages.

"Non Final Office Action", U.S. Appl. No. 09/599,086, (Oct. 28, 2003),21 pages.

"Non Final Office Action", U.S. Appl. No. 09/599,086, (Oct. 31, 2007),48 pages.

"Non Final Office Action", U.S. Appl. No. 09/599,086, (Nov. 13, 2006),33 pages.

"Non Final Office Action", U.S. Appl. No. 09/599,086, (Nov. 14, 2008),55 pages.

"Non Final Office Action", U.S. Appl. No. 09/599,086, (Mar. 3, 2005),25 pages.

"Non Final Office Action", U.S. Appl. No. 10/178,291, (Nov. 26, 2004),21 pages.

"Non Final Office Action", U.S. Appl. No. 10/178,291, (Apr. 29, 2004),14 pages.

"Non Final Office Action", U.S. Appl. No. 10/178,291, (Jun. 27, 2005),22 pages.

"Non Final Office Action", U.S. Appl. No. 10/897,647, (Nov. 14, 2008),28 pages.

"Non Final Office Action", U.S. Appl. No. 10/897,647, (Sep. 6, 2007),21 pages.

"Non Final Office Action", U.S. Appl. No. 10/898,656, (Apr. 18, 2008),17 pages.

"Non Final Office Action", U.S. Appl. No. 10/898,656, (Jul. 13, 2007),13 pages.

"Non Final Office Action", U.S. Appl. No. 10/898,657, (Jul. 18, 2007),18 pages.

"Non Final Office Action", U.S. Appl. No. 10/898,657, (Sep. 8, 2008),24 pages.

"Non-Final Office Action", U.S. Appl. No. 09/599,299, (Oct. 28, 2003),32 pages.

"Non-Final Office Action", U.S. Appl. No. 09/599,299, (Aug. 12, 2004),12 pages.

"Non-Final Office Action", U.S. Appl. No. 09/599,812, (Feb. 27, 2003),20 pages.

"Non-Final Office Action", U.S. Appl. No. 09/599,812, (Feb. 5, 2004),35 pages.

"Non-Final Office Action", U.S. Appl. No. 10/723,863, (Feb. 8, 2007),30 pages.

"Non-Final Office Action", U.S. Appl. No. 10/723,863, (Aug. 23, 2006),16 pages.

"Non-Final Office Action", U.S. Appl. No. 10/723,863, (Nov. 6, 2007),7 pages.

"Non-Final Office Action", U.S. Appl. No. 10/846,428, (Oct. 15, 2008),23 pages.

"Non-Final Office Action", U.S. Appl. No. 10/846,428, (Jul. 19, 2007),19 pages.

"Notice of Allowance", U.S. Appl. No. 09/599,086, (Aug. 17, 2009),59 pages.

"Notice of Allowance", U.S. Appl. No. 09/599,299, (Nov. 30, 2004),7 pages.

"Notice of Allowance", U.S. Appl. No. 09/599,812, (Aug. 3, 2004),12 pages.

"Notice of Allowance", U.S. Appl. No. 10/178,291, (Feb. 6, 2006),7 pages.

"Notice of Allowance", U.S. Appl. No. 10/723,863, (Jun. 30, 2008),9 Pages.

"Notice of Allowance", U.S. Appl. No. 10/846,428, (Apr. 29, 2009),10 pages.

"Notice of Allowance", U.S. Appl. No. 10/897,647, (Jan. 19, 2010),13 pages.

"Notice of Allowance", U.S. Appl. No. 10/898,656, (Jan. 2, 2009),9 pages.

"Notice of Allowance", U.S. Appl. No. 10/898,657, (Jun. 11, 2009),20 pages.

"PCT Search Report", PCT Application No. PCT/US01/15581, (Jan. 29, 2003),3 pages.

Sato, T. et al., "XFIG Version 3.2 Patchlevel 2 Users Manual Edition 1.0", Available at http://tinf2.vub.ac.be/~dvermeir/manuals/xfiq/lib/X11/xfiq/html/index.html, (Jul. 2, 1998),37 pages.

"Advisory Action", U.S. Appl. No. 10/185,048, (Jun. 20, 2006), 3 Pages.

"Advisory Action", U.S. Appl. No. 10/185,048, (Sep. 16, 2005), 3 Pages.

"Advisory Action", U.S. Appl. No. 10/632,437, (Aug. 23, 2006),3 pages.

"Advisory Action", U.S. Appl. No. 10/916,692, (Dec. 10, 2008),3 Pages.

"Applicants' Statement Regarding a Non-Public Use", (May 31, 2006),1 page.

"EP Search Report", EP Application No. 00306806, (Jul. 16, 2003),3 pages.

"EP Search Report", EP Application No. 05112241.4, (Mar. 18, 2010),10 pages.

"EP Search Report", EP Application No. 97307138, (Mar. 21, 2003),3 pages.

"Final Office Action", U.S. Appl. No. 10/185,048, (Mar. 13, 2006),14 Pages.

"Final Office Action", U.S. Appl. No. 10/185,048, (Jun. 3, 2005),14 Pages.

"Final Office Action", U.S. Appl. No. 10/632,437, (Jan. 25, 2008),25 pages.

"Final Office Action", U.S. Appl. No. 10/632,437, (Jun. 1, 2006),21 pages.

"Final Office Action", U.S. Appl. No. 10/781,586, (Aug. 9, 2007),20 pages.

"Final Office Action", U.S. Appl. No. 10/876,418, (May 22, 2008),14 pages.

"Final Office Action", U.S. Appl. No. 10/916,692, (Oct. 2, 2008),10 Pages.

"Final Office Action", U.S. Appl. No. 10/988,732, (Nov. 12, 2010),37 pages.

"Final Office Action", U.S. Appl. No. 11/095,254, (Dec. 22, 2008),9 pages.

"Non Final Office Action", U.S. Appl. No. 09/599,806, (Mar. 12, 2003),7 pages.

"Non Final Office Action", U.S. Appl. No. 09/599,806, (Aug. 17, 2004),5 pages.

"Non Final Office Action", U.S. Appl. No. 10/395,505, (Sep. 11, 2006),8 pages.

"Non Final Office Action", U.S. Appl. No. 10/632,437, (Dec. 16, 2005),22 pages.

"Non Final Office Action", U.S. Appl. No. 10/632,437, (Jul. 26, 2007),19 pages.

"Non Final Office Action", U.S. Appl. No. 10/632,437, (Sep. 10, 2008),28 pages.

"Non Final Office Action", U.S. Appl. No. 10/770,240, (May 1, 2008),30 pages.

"Non Final Office Action", U.S. Appl. No. 10/770,240, (Aug. 24, 2004),25 pages.

"Non-Final Office Action", U.S. Appl. No. 10/185,048, (Dec. 8, 2004),14 Pages.

"Non-Final Office Action", U.S. Appl. No. 10/610,504, (Mar. 9, 2006),12 Pages.

"Non-Final Office Action", U.S. Appl. No. 10/781,586, (Oct. 20, 2006),21 pages.

"Non-Final Office Action", U.S. Appl. No. 10/871,586, (Jan. 9, 2008),22 pages.

"Non-Final Office Action", U.S. Appl. No. 10/876,418, (Sep. 13, 2007),14 pages.

"Non-Final Office Action", U.S. Appl. No. 10/916,692, (Apr. 1, 2008),9 Pages.

"Non-Final Office Action", U.S. Appl. No. 11/095,254, (Apr. 17, 2008),8 pages.

"Notice of Allowance", U.S. Appl. No. 09/599,806, (Jan. 21, 2005),9 pages.

"Notice of Allowance", U.S. Appl. No. 10/395,505, (Oct. 4, 2006),8 pages.

"Notice of Allowance", U.S. Appl. No. 10/610,504, (Sep. 6, 2006),4 Pages.

"Notice of Allowance", U.S. Appl. No. 10/632,437, (May 21, 2009),15 pages.

"Notice of Allowance", U.S. Appl. No. 10/781,586, (May 9, 2008),6 pages.

"Notice of Allowance", U.S. Appl. No. 10/876,418, (Dec. 31, 2008),8 pages.

"Notice of Allowance", U.S. Appl. No. 11/012,472, (Nov. 24, 2010),6 pages.

"OLE Open Doc and Network", Retrieved from http://www.pcwebopedia.com on May 9, 2006 Webopedia entries,(May 16, 1998),7 pages.

"PCT Search Report", PCT Application No. PCT/IB98/01392, (Apr. 9, 1999),3 pages.

"PCT Search Report", PCT Application No. PCT/IB99/02003, (Nov. 28, 2000),3 pages.

"PCT Search Report", PCT Application No. PCT/US99/09620, (Sep. 22, 1999),3 pages.

"Restriction Requirement", U.S. Appl. No. 09/599,806, (Mar. 3, 2003),5 pages.

"Restriction Requirement", U.S. Appl. No. 10/770,240, (Jan. 26, 2009),7 pages.

"Restriction Requirement", U.S. Appl. No. 10/781,586, (Jun. 26, 2006),5 pages.

"Restriction Requirement", U.S. Appl. No. 11/095,254, (Nov. 1, 2007),8 pages.

"Supplemental Notice of Allowance", U.S. Appl. No. 10/781,586, (Jul. 18, 2008),3 pages.

"Supplemental Notice of Allowance", U.S. Appl. No. 10/781,586, (Jun. 4, 2008),2 pages.

Asche, Ruediger R., "Multithreading for Rookies", *Microsoft Developer Network Technology Group*, Retrieved Apr. 17, 2002 from http://msdn.microsoft.com/library/en-us/dndllpro/html/msdn__threads.asp?frame=true, (Sep. 24, 1993),13 pages.

Baldwin, J F., et al., "A Mass Assignment Based ID3 Algorithm for Decision Tree Introduction", *International Journal of Intelligent Systems*, vol. 12, No. 7, (1997),pp. 523-548.

Cloete, I et al., "CID3: An Extension of ID3 for Attributes with Ordered Domains", *South African Computer Journal*, vol. 4, (1991),pp. 10-16.

Kath, Randy "Managing Virtual Memory in Win32", *Microsoft Developer Network Technology Group*, Retrieved Apr. 17, 2002 from http://msdn.microsoft.comilibrary/en-us/dngenlib/html/msdn__virtmm.asp?frame=true, (Jan. 20, 1993),9 pages.

Mehta, Manish et al., "SLIQ: A Fast Scalable Classifier for Data Mining" available at <<http://www.dbis.informatik.hu-berlin.de/dbisold/lehre/WS0405/KDD/paper/MAR96.pdf >>, (Mar. 1996),15 Pages.

Sebastiani, F "A Tutorial on Automated Text Categorisation", *In Analia Amandi and Ricardo Zunino, editors, Proceedings of ASAI-99, 1st Argentinean Symposium on Artificial Intelligence*, Buenos Aires AR, (1999),pp. 7-35.

Zaki, Mohammed J., et al., "Parallel Classification for Data Mining on Shared-Memory Multiprocessors", *ACM* (Mar. 1999),pp. 1-8.

"Foreign Office Action", EP Application No. 05112241.4, (Dec. 23, 2010),6 pages.

"Foreign Office Action", Japanese Application 2002-504575, (Dec. 14, 2010),4 pages.

"Non-Final Office Action", U.S. Appl. No. 12/028,651, (Jan. 3, 2011),16 pages.

"Notice of Allowance", U.S. Appl. No. 11/012,472, (Nov. 24, 2010),6 pages.

"Notice of Allowance", U.S. Appl. No. 11/107,347, (Dec. 13, 2010),11 pages.

"Notice of Allowance", U.S. Appl. No. 11/218,149, (Feb. 11, 2011),7 pages.

"Notice of Allowance", U.S. Appl. No. 11/931,730, (Feb. 2, 2011),7 pages.

"Supplemental Notice of Allowance", U.S. Appl. No. 12/021,894, (Jan. 12, 2011),6 pages.

"Supplemental Notice of Allowance", U.S. Appl. No. 12/021,894, (Feb. 8, 2011),6 pages.

"Non Final Office Action", U.S. Appl. No. 11/567,140, (Feb. 18, 2011),8 pages.

"Non-Final Office Action", U.S. Appl. No. 11/927,296, (Mar. 4, 2011),19 pages.

"Supplemental Notice of Allowance", U.S. Appl. No. 11/931,730, (Mar. 2, 2011),2 pages.

* cited by examiner

STRUCTURAL EDITING OPERATIONS FOR NETWORK FORMS

TECHNICAL FIELD

This invention relates to structural editing operations for network forms.

BACKGROUND

Electronic forms are commonly used to collect information. One way in which to enable use of electronic forms is over a network, such as a local intranet or the Internet. A user may use an electronic form, for instance, through his or her network browser. The user's network browser may contact over a network a network computer that is capable of enabling the browser to display and enable editing of the electronic form.

The user's browser may present a view of the network-enabled electronic form and enable the user to edit the form through that view. Thus, a user may view data-entry fields in the network form and enter information into those fields. Suppose, for example, that the user wishes to shop online. The user may contact a merchant's website and select to purchase a product. Following receipt of the user's selection to purchase, a merchant may want to collect information about the user, such as the user's name, credit card billing address, shipping address, gift shipping address, and credit card number, for instance.

To collect this information, the merchant (through the merchant's network computer) may enable the user's browser to display and enable editing of a form for entry of this information. In this case, the network-enabled electronic form may show data-entry fields and controls for entry of the user's name, credit card billing address, shipping address, gift shipping address, and credit card number. Having the browser display all of these data-entry fields in the network form, however, may clutter the network form and make entry of the information difficult or confusing for the user. If the user is buying the product for himself and wants it shipped to the same address as his billing address, he may not need or want to view data-entry fields for a shipping address and a gift shipping address. In this case, the shipping-address data-entry fields and the gift shipping-address data-entry fields clutter up the form.

The merchant may, on the other hand, enable the user's browser to display the billing address and two buttons—one for selecting to view and edit shipping-address data-entry fields and another for gift shipping-address data-entry fields. This reduces the clutter caused by showing unwanted data-entry fields in the network form.

But the user may want to ship the product to a friend as a gift. To do so, the user may select the button to view and edit the gift shipping-address fields. To enable the browser to display and enable editing of these fields the network computer may need to alter the structure of the network form's data instance. Thus, the network computer may need to add data nodes for these gift shipping-address fields to its data instance, and, based on these added nodes, determine information with which the browser may enable a user to view and edit the gift shipping-address fields.

Determining this information on the network computer, altering the form's data instance, and re-computing the view, however, expends some of the network computer's resources. Expending these resources may slow or inhibit the network computer's ability to enable the merchant's customers to view and edit electronic forms.

Also, communicating with the network computer may slow the browser enough to negatively affect the user's editing experience. In some cases, the network computer may take an appreciable amount of time to receive the request from the browser, determine the information usable by the browser, and send that information to the browser. Also, communicating with the network computer may be slow because of the network or how the browser communicates with it (e.g., with a dial-up modem), also potentially affecting a user's editing experience.

Accordingly, this invention arose out of concerns associated with performing structural editing operations for network forms.

SUMMARY

Systems and/or methods ("tools") are described that enable an operation associated with an altered structure of a data instance of a network form without first altering the structure of the data instance.

BRIEF DESCRIPTION OF THE DRAWINGS

The same numbers are used throughout the disclosure and figures to reference like components and features.

DETAILED DESCRIPTION

Overview

The following disclosure describes one or more tools enabling an operation associated with an altered structure of a data instance of a network form without first altering the structure of the data instance. In one embodiment, this enabling is performed locally without performing a roundtrip to a network computer for additional information, such as information comprising a rendering of an alteration of the structure of the network form's data instance.

In another embodiment, the tools approximate a view and editing experience associated with a structural alteration of a data instance of a network form without necessitating that structural alteration of the data instance. By so doing, the tools may, in some cases, permit a user to add a view and editing experience associated with a structural alteration of the network form's data instance without communicating with the network form's network.

In still another embodiment, the tools enable a user to enter an edit into a view of a network form, the edit eventually requiring a structural change to a data instance of the network form, without first structurally changing the data instance. By so doing, the tools may, in some cases, permit a user to enter an edit into a data-entry field that eventually requires a structural alteration of the network form's data instance, without first having to wait for communication with the network form's network computer. This edit may be recorded for later submittal to the network computer at some point, such as when the wait is less disruptive to the user's editing experience.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to any one particular operating environment.

Figure 1:
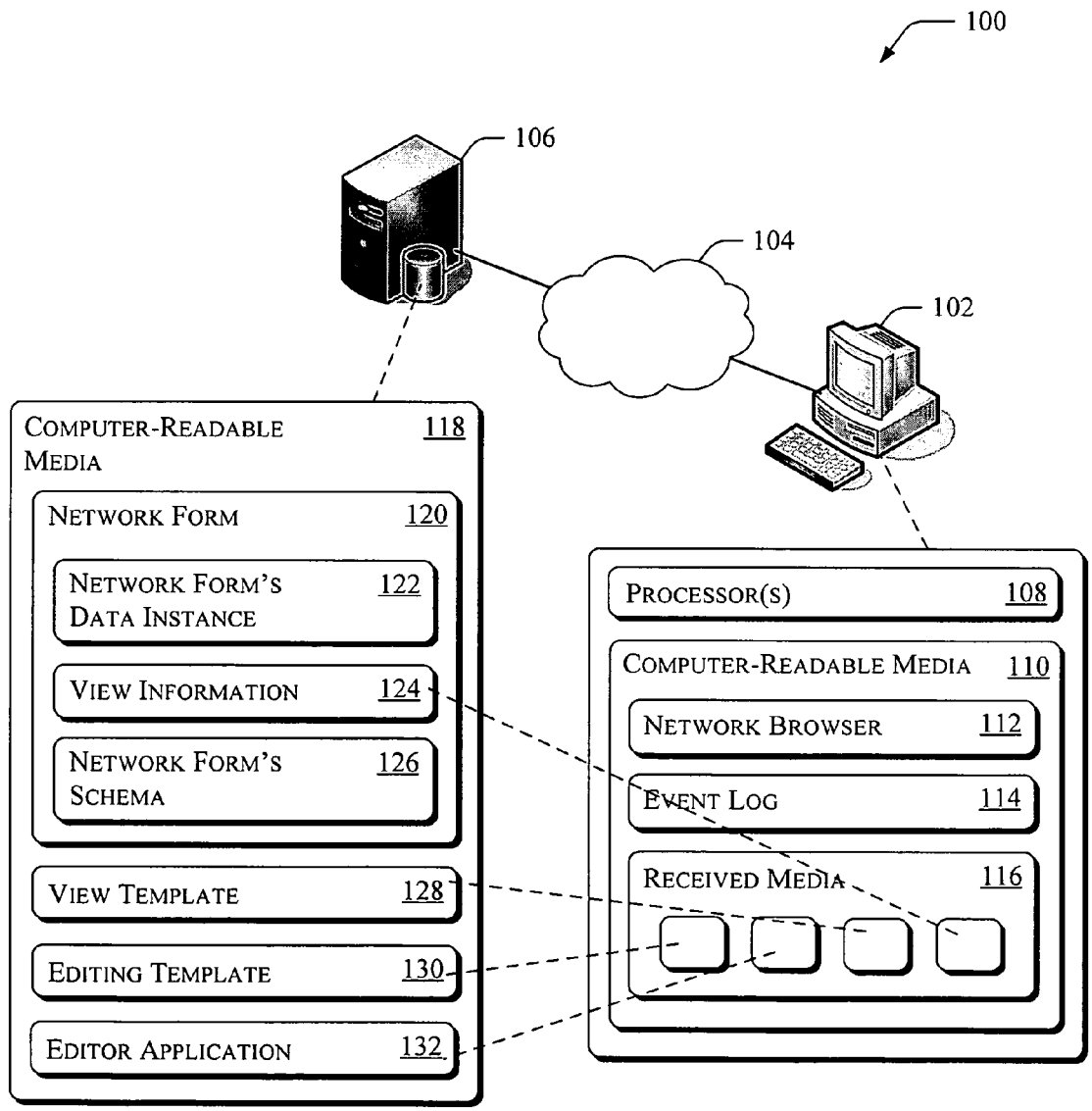
FIG. 1 illustrates an exemplary operating environment in which various embodiments can operate.

FIG. 1 illustrates one such operating environment generally at 100 comprising a computer 102, a communication network 104, and a network computer 106. The computer is shown comprising one or more processor(s) 108 and computer-readable media 110. The processor(s) are capable of accessing and/or executing the computer-readable media. The computer-readable media comprises a network browser 112, an event log 114, and received media 116. The dashed lines between the received media and media of the network computer show that these indicated media may be downloaded by the computer from the network computer.

The communication network enables communication between the computer and the network computer and may comprise one or more of an intranet, like a company's internal network, the Internet, and the like.

The network computer is shown comprising computer-readable media 118. This computer-readable media comprises a network form 120 comprising a data instance 122 of the network form, view information 124 of the network form, and a schema 126 governing the network form. The network form's data instance is a particular data instance of the network form; thus, if the structure or data of the network form is changed (such as by a user entering information into a view of the network form), the network form's data instance may be altered, at some point in time, to reflect the change. The view information is information sufficient for the network browser to display an editable view of the current data instance of the network form.

In one embodiment, the network form's data instance is modeled with a hierarchical tree structure. In this and other embodiments, the network form's data instance may comprise eXtensible Markup Language (XML). Also, the view information may comprise HyperText Machine Language (HTML) resulting from an XML Stylesheet Language Transformation (XSLT) of the XML data instance. This HTML is usable by the network browser to display the network form. The network form's schema governs the network form. In the above-mentioned embodiment, it comprises XML Schema (XSD).

The network computer's computer-readable media is also shown comprising a view template 128, an editing template 130, and an editor application 132. The view template, editing template, and editor application may be combined or separate.

The view template comprises pieces of information sufficient for the editor application and/or the network browser to display potential structural alterations to the network form's data instance. Each of these pieces of information may comprise, for example, HTML for viewing the potential structural alteration to the network form's data instance. In one embodiment, this view template is prepared by discovering positions in the network form's syntax where it is possible for a user to request a structural change or to which a requested structural change may be made. Identifiers are then created for each of these positions. Also, a rendering of each possible structural alteration is created and mapped to the position identifiers. Thus, the view template may comprise an actual view representation of what a user would see if the requested structural alteration were made to the network form's data instance and that data instance where transformed into a viewable form (such as HTML).

The editing template comprises information sufficient for the editor and/or the network browser to enable editing behavior for potential structural alterations to the network form's data instance. The editing template may comprise script, rules determined by schema 126, and logic, for instance. These enabled behaviors may, similar to the pieces of the view template, be mapped to positions (e.g., with an identifier) in the network form's syntax where it is possible for a user to request a structural alteration or to which a requested structural alteration may be made. The editing template may also comprise default data and the like for a potential structural alteration. Default data may comprise, for example, values for simple fields (like date, currency, and name fields), a number of repetitions for lists, tables, and rows, and whether or not optional content that is allowable by a schema should be present.

Various embodiments of the view and editing templates and how they may be used are set forth in greater detail below.

Operation Associated with a Structural Alteration

The following discussion describes exemplary ways in which the tools enable an operation associated with an altered structure of—or eventually necessitating an alteration to—a data instance of a network form (a "structural operation").

Figure 2:
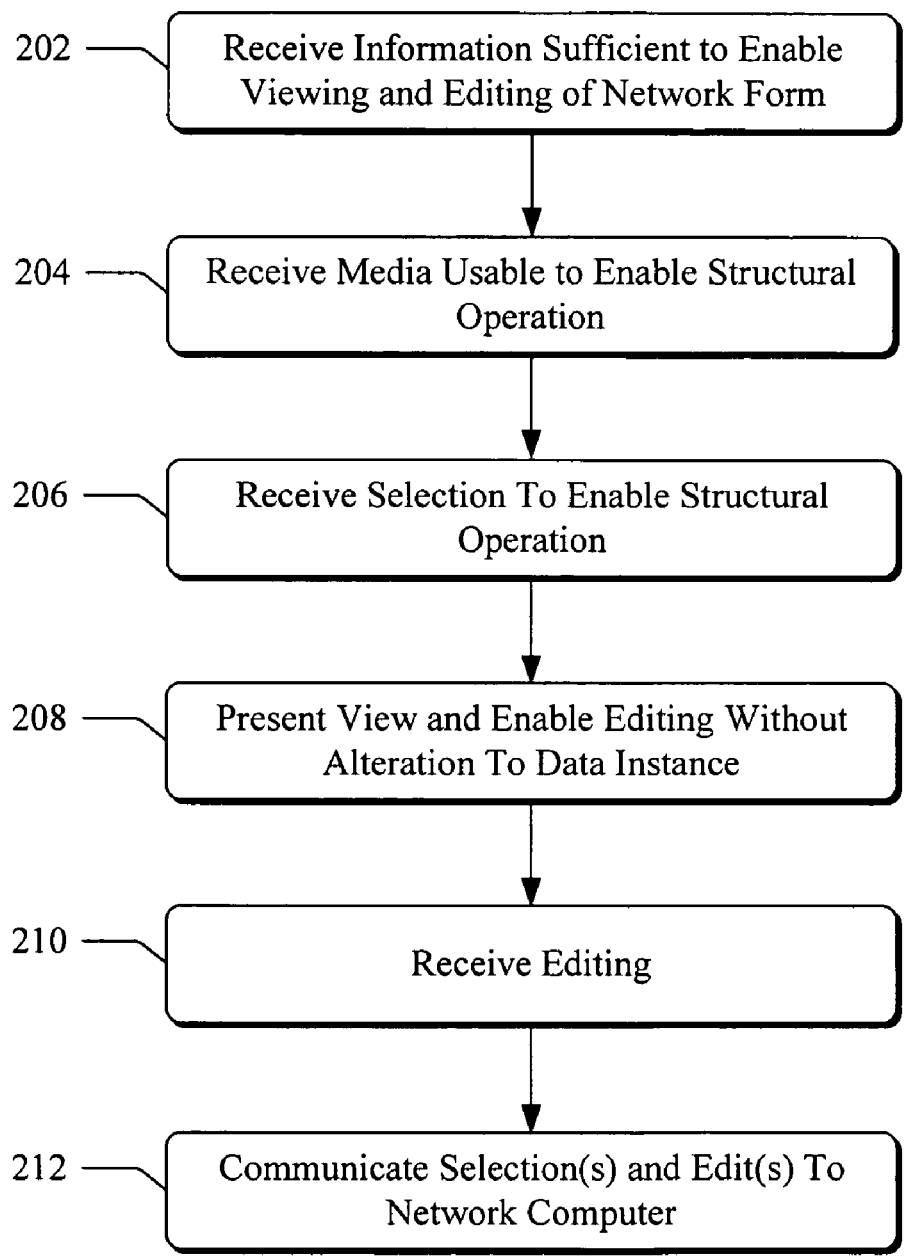
FIG. 2 is a flow diagram of an exemplary process for enabling a structural operation in a network form.

An exemplary process 200 for enabling a structural operation without first altering the structure of the network form's data instance or without using the altered structure of the data instance is shown in FIG. 2. Process 200 is illustrated as a series of blocks representing individual operations or acts performed by elements of the operating environment 100 of FIG. 1, such as editor application 132. This process may be implemented in any suitable hardware, software, firmware, or combination thereof; in the case of software and firmware, this process represents a set of operations implemented as computer-executable instructions stored in computer-readable media 110 and executable by processor(s) 108.

At block 202, network browser 112 receives information sufficient to enable computer 102 to display the network form and enable operations not requiring a structural change to the network form's data instance. With this information, the network browser may present the network form and enable a user to edit it, such as with data-entry fields into which the user may enter data. In one embodiment this information comprises view information 124 of FIG. 1.

At block 204, the network browser receives computer-readable media usable to enable a structural operation for the network form. In one embodiment this computer-readable media comprises view template 128, editing template 130, and editor application 132.

With the information received at block 202, the network browser may render network form 120 for viewing and editing by a user. Consider, for example, an exemplary view 300 of network form 120 set forth in FIG. 3. As shown in this view, the browser displays the network form having various data-entry fields. A user may enter his credit card billing address through the data-entry fields 302, for instance. The browser also displays controls for selecting structural operations, shown here with a shipping address selectable control 304 and a gift shipping-address selectable control 306.

At block 206, the network browser receives a selection by a user to enable a structural operation. This may be indirect or direct from the user, such as by tabbing out of a data-entry field, selecting from a drop down list, and clicking on a control to add or remove data-entry fields. A user may, for example, add or remove repeating data constructs, such as by adding or removing items from a shopping cart. Removing constructs (e.g., data-entry fields) may un-clutter the view and/or reduce (eventually) the size of the form's data instance. Reducing the size of the form's data instance may reduce the resources used by the network computer serving the form.

Figure 3:
FIG. 3 illustrates an exemplary view of a network form.

Continuing the illustrated embodiment, assume that the user clicks on the gift shipping-address button or control in the view 300 of FIG. 3.

At block 208, the editor application enables the selected structural operation without first altering the structure of the data instance. This may enable an editing operation associated with an altered structure of a data instance of a network form to take place initially in the network browser without actually changing the structure of a data instance of the form on the network computer. In the ongoing embodiment, executing the chosen structural operation comprises presenting a view and/or enabling editing associated with the altered structure of the data instance of the network form.

This presenting and enabling is performed, in one embodiment, locally without performing a roundtrip to a network computer for additional information, such as information comprising a rendering of an alteration of the structure of the network form's data instance. Thus, the editor application may present the view and enable editing without an alteration to the structure of the data instance of the network form. The view presented may be built from pieces of information in the view template sufficient for the editor application and/or the network browser to correctly display the view of the form in the browser corresponding to the chosen structural alteration to the network form's data instance without changing that data instance. In doing so, the editor application may compute a modified view and editing experience as if the data instance of the network form is changed without actually requiring that the structural change to be made to the data instance.

The editor application may determine editing behavior based on the user's selection, such as based on the position in the data instance at which the requested structural alteration corresponds. This position and/or an associated identifier is further associated with editing behavior. This editing behavior may be acquired from editing template 130 stored in received media 116 of FIG. 1.

Figure 4:
FIG. 4 illustrates the view of FIG. 3 with an exemplary view approximation approximating a transformation of the network form's data instance.

Continuing the illustrated embodiment, consider FIG. 4. FIG. 4 shows a view approximation 402 showing gift shipping-address data-entry fields 404 approximating a transformation of the network form's data instance.

In this embodiment, the editor application determines a position in (or portion of) the electronic form's data instance at which the requested structural alteration corresponds. This position or portion, in turn, is associated with an identifier associated with information in the view template comprising one or more viewing pieces usable to enable the presentation. The presentation may be enabled by adding these pieces to the view. It may also be enabled by removing these pieces from the view, such as in those cases where the structural alteration is associated with removal of a part of the view. The view template may comprise one piece of HTML for all of the view approximation 402 (e.g., the modified section of the view). Alternatively, it may comprise HTML for each of the fields 404 (e.g., HTML for a Name field 406, HTML for a ZIP Code field 408, etc.) and information sufficient for the editor to arrange the HTML to present the view approximation.

Also, the editor application may determine whether or not data should be presented as well. This data may comprise default data for the requested structural alteration. In this case (not shown) the editor application may display the default data for the requested structural alteration.

The editor application then enables editing through the view approximation. The view approximation comprises an update to the view and may enable further editing through the view that may be identical to a view and editing behavior obtainable by communicating with the network computer.

In some cases, the editor application also enables an additional structural alteration associated with and/or subordinate to the selected structural alteration. This additional structural alteration may, in one embodiment, be one that is only enabled if the selected structural alteration is enabled. A user may, for instance, select the gift shipping-address data-entry fields. In response, the editor application may enable editing through these data-entry fields and also enable an associated structural alteration, such as with a button in the view enabling the user to select to have the product gift wrapped. If the user selects this button, the editor application may present additional data-entry fields or information, such as the cost, type of wrapping paper, and the like. Thus, the editor application may, in some cases, enable subordinate ("nested") structural alterations.

In the illustrated embodiment, the editor application enables editing behavior permitting only text entry into Name data-entry field 406 and only numbers into ZIP Code data-entry field 408. It also enables a function to auto-populate a city into a city field 410 and a State into a state field 412 corresponding to a valid ZIP code if one is entered into the ZIP code field prior to a city and State being entered.

In some cases, prior to or incident with block 208, the editor application determines whether or not the selected structural operation is one in which immediate communication with the network computer is needed in order for the approximation to be accurate. In situations where the approximation will not be entirely accurate, the editor application may either enable the structural operation and note the inaccuracy or communicate with the network computer.

At block 210, the editor application receives editing. This editing may comprise a request to enable another structural operation or entry of data. If a request, the editor application may return to block 206. Whether a request to enable another structural operation or a non-structural editing operation (like a text editing operation), each editing operation may be recorded in event log 114. In some cases, the editing operations are recorded in the event log as a flat list. If the edit is to a structural operation, the editor application receives the editing and acts according to the editing behavior enabled at block 208. This behavior may be represented to the user, for instance, by presenting additional HTML showing the data entered.

Following, prior to, or coincident with blocks 206, 208, or 210, the editor application records the user's interactions into event log 114. The editor application may record each command for structural or non-structural editing (e.g., data entry), and in what context the editing was made (e.g., what structural part of the form, like a data-entry field) in order to accurately record the user's interaction. In this way, at a later point when the browser communicates with the network computer (for example, when the user chooses to submit the form), the editing actions may be carried out on the form's data instance. The user may observe no change in the form displayed in the browser once the editing actions are carried out on the form's data instance because the view has already been correctly updated during the previous editing. In some cases, however, if the editor application has not been completely accurate in updating the view, this communication with the network computer may lead to a correction to the view of the form in the browser. This correction provides a more accurate accounting by which the electronic form's structural and data aspects of its data instance are altered.

At block 212, the editor application communicates selections and edits of the user to the network computer. This communication may be at a time when it is not inconvenient to a user or when the user chooses to submit the form, for instance.

Continuing the illustrated embodiment, the editor application communicates an accounting of each interaction with the user to the network computer recorded in the event log of FIG. 1 once the user clicks on a submit purchase control 414 of FIG. 4.

Responsive to receiving this communication, the network computer may alter the data instance of the network form. It may alter the structure of the data instance requested by the user's selection to enable a structural operation. It may also alter the data of the network form's data instance responsive to edits received from the user. If the view representation accurately approximated a transformation of the altered data structure, the editor application may forgo altering the view representation. If the view representation did not exactly approximate a transformation of the altered data structure, the editor application may correct the view representation or not, based on the magnitude of the difference between the view representation and the transformation.

CONCLUSION

Tools enabling an operation associated with an altered structure of a data instance of a network form without first altering the structure of the data instance are described. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
receiving, through a view approximating an existing instance of a network form, a selection from within the network form sufficient to cause a visual, structural change of the network form eventually necessitating an alteration to a data structure of the existing instance of the network form, wherein the existing instance of the network form is accessible across a communication network but is locally inaccessible;
enabling the visual, structural change without first altering the data structure of the existing instance of the network form; and
updating the view based on the visual, structural change and also without first altering the data structure of the existing instance of the network form.

2. The method of claim 1, wherein the act of enabling is performed following the act of receiving the selection, and the alteration to the data structure of the existing instance of the network form is eventually performed at a network computer.

3. The method of claim 1, further comprising:
enabling selection of a second visual, structural change eventually necessitating an alteration to the data structure of the existing instance of the network form, the second visual, structural change being subordinate to the first visual, structural change;
receiving a selection to enable the second visual, structural change;
enabling the second visual, structural change without first altering the data structure of the existing instance of the network form; and
updating the view based on the second visual, structural change and also without first altering the data structure of the existing instance of the network form.

4. The method of claim 1, wherein the act of updating the view approximates a transformation of the alteration to the data structure of the existing instance of the network form.

5. The method of claim 4, wherein the act of updating the view comprises:
determining a position in the existing instance of the network form associated with the selection;
determining an identifier corresponding to this position;
determining one or more viewing pieces associated with the identifier; and
displaying the one or more viewing pieces.

6. The method of claim 1, wherein the act of enabling the visual, structural change comprises enabling editing behavior that approximates behavior permitted by a schema governing the alteration to the data structure of the existing instance of the network form.

7. The method of claim 6, wherein the act of enabling editing behavior comprises:
determining a position in the existing instance of the network form associated with the selection; and
determining the editing behavior in an editing template mapped with this position.

8. The method of claim 6, further comprising:
recording the selection;
communicating the selection to a network computer having the existing instance of the network form, effective to enable the alteration to the data structure of the existing instance of the network form;
receiving edits from a user; and
communicating the edits to the network computer effective to enable addition of the edits to the existing instance of the network form.

9. The method of claim 1, further comprising recording the selection and communicating the selection to a network computer having the existing instance of the network form, wherein the act of communicating the selection is effective to enable the alteration to the data structure of the existing instance of the network form.

10. A method comprising:
approximating a view associated with a structural alteration of an existing instance of a network form, wherein the existing instance of the network form is accessible across a communication network but is locally inaccessible; and
approximating an editing experience associated with the structural alteration of the existing instance of the network form,
wherein the act of approximating the view and the act of approximating the editing experience are performed without the existing instance of the network form having the structural alteration.

11. The method of claim 10, wherein the act of approximating the view comprises:
determining a portion of the existing instance of the network form associated with the structural alteration;
determining one or more viewing pieces associated with this portion; and
removing the one or more viewing pieces from the view.

12. The method of claim 10, wherein the act of approximating the view comprises:
  determining a position in the existing instance of the network form at which the structural alteration can be made;
  selecting one or more viewing pieces associated with this position; and
  displaying the one or more viewing pieces.

13. The method of claim 10, wherein the act of approximating the editing experience comprises:
  determining a position in the existing instance of the network form at which the structural alteration can be made; and
  selecting the editing behavior associated with this position from an editing template.

14. The method of claim 10, further comprising:
  receiving a selection to view and edit the structural alteration;
  recording the selection; and
  following the acts of approximating, communicating the recorded selection to a network computer having the existing instance of the network form effective to enable the structural alteration to be made to the existing instance of the network form.

15. The method of claim 10, further comprising:
  displaying, prior to the act of approximating the view, a prior view comprising a rendering of the existing instance of the network form,
  wherein the act of approximating the view comprises altering the prior view to accommodate the approximated view associated with the structural alteration.

16. The method of claim 10, further comprising receiving edits from a user enabled by the approximated view and the approximated editing experience.

17. The method of claim 16, further comprising communicating the edits and information associated with the structural alteration to a network computer, the information effective to enable the structural alteration of the existing instance of the network form and the edits effective to enable alteration to data comprised by the structural alteration of the existing instance of the network form.

18. A method comprising:
  receiving a selection to enable an editing operation in a network form, wherein the editing operation requires an alteration of a data structure of an existing instance of the network form and the existing instance of the network form is accessible across a communication network but is locally inaccessible;
  recording the selection;
  displaying a view enabling entry of edits for the editing operation;
  enabling behavior for the edits approximating behavior associated with the required alteration of the data structure of the existing instance of the network form;
  receiving user edits through the view;
  recording the user edits;
  communicating the recording of the selection across the communication network effective to enable the alteration to the data structure of the existing instance of the network form; and
  communicating the recording of the user edits across the communication network effective to enable alteration of data within the alteration of the data structure of the existing instance of the network form.

19. The method of claim 18, wherein:
  the act of recording the user edits comprises:
  recording data entered by a user; and
  recording a structural context in which the data is entered, and
  wherein the act of recording the selection comprises:
  recording a command entered by the user; and
  recording a structural context in which the command is entered.

* * * * *